(12) United States Patent
Takahashi et al.

(10) Patent No.: US 6,819,491 B2
(45) Date of Patent: Nov. 16, 2004

(54) OBJECTIVE LENS UNIT FOR OPTICAL PICKUP, OPTICAL PICKUP AND DISC DRIVING DEVICE

(75) Inventors: Toyokazu Takahashi, Kanagawa (JP); Satoshi Hineno, Kanagawa (JP)

(73) Assignee: Sony Corporation (JP)

( * ) Notice: Subject to any disclaimer, the term of this patent is extended or adjusted under 35 U.S.C. 154(b) by 11 days.

(21) Appl. No.: 10/333,402

(22) PCT Filed: May 22, 2002

(86) PCT No.: PCT/IB02/01755
§ 371 (c)(1),
(2), (4) Date: Jan. 21, 2003

(87) PCT Pub. No.: WO02/103430
PCT Pub. Date: Dec. 27, 2002

(65) Prior Publication Data
US 2003/0174416 A1 Sep. 18, 2003

(30) Foreign Application Priority Data
May 22, 2001 (JP) ........................................ 2001-152168
Mar. 12, 2002 (JP) ........................................ 2002-066804

(51) Int. Cl.[7] ............................. G02B 27/44; G02B 5/18
(52) U.S. Cl. ....................... 359/566; 359/565; 359/571; 359/574; 369/112.03; 369/112.08
(58) Field of Search ................................ 359/565, 566, 359/569–571, 574–575; 369/112.03–112.08, 112.1–112.13, 112.15, 112.2

(56) References Cited

U.S. PATENT DOCUMENTS

| 5,936,782 A | * | 8/1999 | Nomura et al. ............. 359/719 |
| 5,949,577 A | * | 9/1999 | Ogata ......................... 359/565 |
| 6,215,591 B1 | * | 4/2001 | Ueda et al. ................. 359/571 |
| 2001/0028514 A1 | * | 10/2001 | Asoma ....................... 359/719 |

FOREIGN PATENT DOCUMENTS

| JP | 06-331887 | 12/1994 |
| JP | 09-311271 | 12/1997 |
| JP | 2000-035535 | 2/2000 |
| JP | 2001-194581 | * 7/2001 |

* cited by examiner

*Primary Examiner*—Leo Boutsikaris
(74) *Attorney, Agent, or Firm*—Rader, Fishman & Grauer PLLC; Ronald P. Kananen

(57) ABSTRACT

An objective lens unit for an optical pickup used for recording and/or reproducing information signals from an optical disc. The objective lens unit includes a resin layer (21) having, sequentially from an object side, a first surface $S_1$ as an aspherical surface and a second surface $S_2$ as an aspherical surface, at least one of the first surface and the second surface including a diffractive surface, and a lens of glass (22) having the second surface $S_2$ as an aspherical surface and a third surface $S_3$ as an aspherical surface. The lens unit is corrected for the chromatic aberration on an image surface on the optical axis with respect to the light of a reference wavelength not larger than 420 nm within several nm of the reference wavelength, with the numerical aperture of the lens unit being not less than 0.8. This objective lens unit is able to converge the laser light close to the limit of diffraction on the image surface.

27 Claims, 22 Drawing Sheets

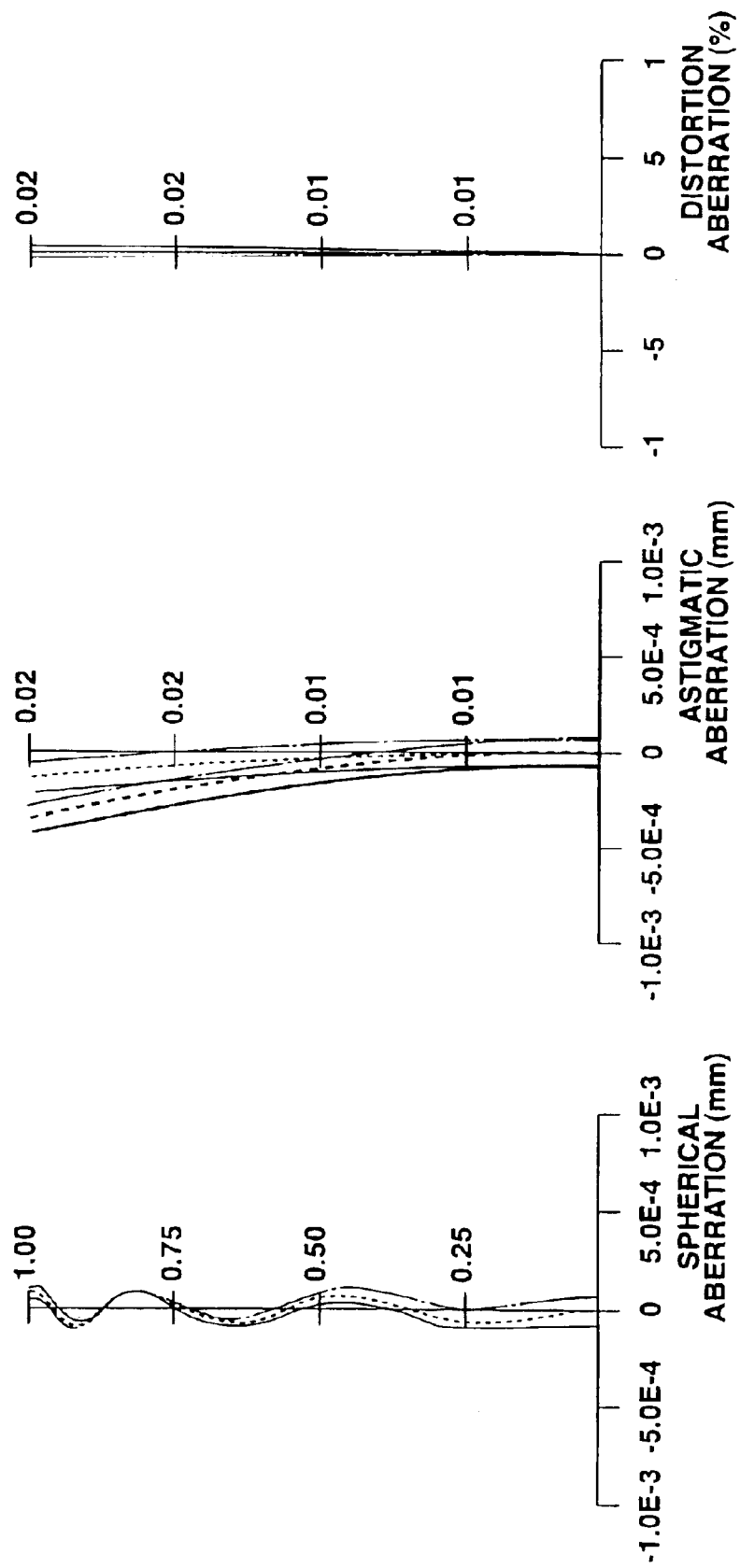

OBJECTIVE LENS UNIT FOR OPTICAL PICKUP, OPTICAL PICKUP AND DISC DRIVING DEVICE

TECHNICAL FIELD

This invention relates to an objective lens unit for an optical pickup used for a disc driving device illuminating the laser light on an optical recording medium for recording and/or reproducing the information, an optical pickup employing this objective lens unit and to a disc driving device employing this objective lens unit. Specifically, this invention relates to an objective lens unit capable of converging the laser light close to the diffraction limit on a recording surface of the optical recording medium, an optical pickup employing this objective lens unit, and to a disc driving device employing this optical pickup.

BACKGROUND ART

As a recording medium for information signals, a non-contact optical recording medium, having a high recording density, and adapted for illuminating the laser light on the recording surface for recording and/or reproducing the information, is finding widespread application. Of the various types of the optical recording medium, a disc-shaped optical recording medium, referred to below as an optical disc, is used most extensively because of ease in retrieving the information recorded thereon.

An optical disc has concentric recording tracks or a spirally-shaped recording track. The separation between neighboring recording tracks or neighboring turns of the recording track, or a track pitch, is approximately 1.6 $\mu$m in the case of, for example, a Compact Disc (CD). In a DVD (Digital Video Disc/Digital Versatile Disc), developed more recently, this track pitch is of a narrower value of 0.74 $\mu$m, which means appreciably improved recording density of the information signals. For radiating the laser light on an optical disc in which the track pitch is reduced to improve the information recording density for recording and/or reproducing information signals, such as DVD, it is necessary to form a beam spot, smaller in size than for an optical disc with a larger track pitch, on its recording surface.

The diameter of the beam spot converged by the objective lens unit is proportionate to the to the design diameter of the laser light and inversely proportionate to the numerical aperture NA of the laser light. Thus, for diminishing the diameter of the beam spot illuminated on the optical disc, it is necessary to increase the numerical aperture of the objective lens unit and to reduce the wavelength of the laser light.

On the other hand, since a high energy laser light is required for recording the information by a phase change system, or the like. For reducing the laser noise by the reflected laser light, the driving power is varied by a method of superposing the high frequency on the voltage or the driving current of the laser light emitting device to vary the laser light wavelength in a short period. Thus, in an optical pickup adapted for illuminating the coherent laser light on the optical disc, chromatic aberration ascribable to wavelength variation on the order of several nm is produced to enlarge the beam spot on the optical disc.

Meanwhile, the optical pickup is provided with an objective lens unit 201 for converging the laser light 200 on the signal recording surface of the optical disc. This routine objective lens unit 201 is formed by a single lens molded of glass and has an aspherical surface 201a having high light converging power, as shown in FIG. 1.

Referring to the charts of FIGS. 2A, 2B and 2C, showing the spherical aberration astigmatic aberration and distortion aberration, respectively, it may be seen that the chromatic aberration on the order of ±0.6 $\mu$m/nm is produced against wavelength variation of ±2 nm, even with the use of the aspherical surface 201a. In the aberration charts of FIGS. 2A to 2C, solid lines, dotted lines and chain-dotted lines depict the values for 405 nm, 403 nm and 407 nm, respectively, whereas, in FIG. 2B showing the astigmatic aberration, thick and thin lines depict a sagittal image surface and a tangential image surface, respectively.

For recording the information on an optical disc, in which the track pitch of the recording track is narrowed for increasing the recording density, it is desirable to converge the laser light close to the diffraction limit by the objective lens unit to form a beam spot of a smaller diameter. With the single lens type objective lens unit 201, produced as conventionally by casting glass with the aspherical surface 201a, it is difficult to converge the laser light close to the diffraction limit because of the chromatic aberration distortion aberration.

DISCLOSURE OF THE INVENTION

In view of the above depicted status of the art, it is an object of the present invention to provide an objective lens unit that may be used with advantage for an optical pickup used for recording the information on an optical recording medium, in which the track pitch is narrowed to raise the recording density, and for reproducing the information recorded on the optical recording medium. It is a more specific object of the present invention to provide a small-sized objective lens unit that is capable of effectively correcting the chromatic aberration and converging the light beam close to the diffraction limit.

It is another object of the present invention to provide an optical pickup employing an objective lens unit that is capable of effectively correcting the chromatic aberration and converging the light beam close to the diffraction limit, and an optical disc employing this optical pickup.

For accomplishing the above object, the present invention provides an objective lens unit for an optical pickup including a resin layer having, sequentially from an object side, a first surface as an aspherical surface and a second surface as an aspherical surface, at least one of the first surface and the second surface including a diffractive surface, and a lens of glass having the second surface as an aspherical surface and a third surface as an aspherical surface. The lens unit is corrected for the chromatic aberration on an image surface on the optical axis with respect to the light of a reference wavelength not larger than 420 nm within several nm of the reference wavelength, with the numerical aperture of the lens unit being not less than 0.8. With this objective lens unit, the light can be converged on the image surface close to the limit of diffraction.

According to the present invention, the base surface defining the objective lens unit necessarily has a value of the aspherical coefficient, so that the diffraction type lens can be formed to an optically well-balanced stabilized state.

With the objective lens unit of the present invention, the aspherical surface of the first surface and the aspherical surface of the second surface are of the same base curvature and the same aspherical coefficient, so that the resin layer is of the constant film thickness to increase stability against changes in temperature. With the objective lens unit of the present invention, the resin layer, the first surface or the second surface of which is the diffractive surface, is of the transmission phase type, with the first surface or the second surface being of the blazed shape, so that the numerical aperture of the lens unit may be increased without diminishing the radius of curvature of the base surface of the lens unit. Since the first or second surface, as the diffractive surface, is of the blazed shape, it is possible to eliminate diffraction efficiency deteriorating factors, such as non-machinable portions, or transmittance deteriorating factors, such as a serrated shape, during the forming of the diffraction surface.

With the objective lens unit of the present invention, an aperture is formed in the outer rim of the first surface so as to allow usage of only the lens surface portion exhibiting desirable optical properties and so as not to allow usage of the lens rim to suppress production errors to stabilize the performance in assembling the lens unit.

With the objective lens unit of the present invention, in which the design degree of orders is not less than two, it is possible to correct for chromatic aberration more effectively to wine-press the spot diameter of the laser light close to the diffraction limit, while it is also possible to cope with an optical recording medium in which the track pitch is reduced to raise the information recording density.

The single lens of glass, forming the objective lens unit of the present invention, is formed of a vitreous material, having a refractive index of 1.65 or more with respect to the light of a wavelength of 420 nm or less, and hence the single lens of glass is of the meniscus shape to allow miniaturization of the third order aberration.

With the objective lens unit of the present invention, in which the fine micro-irregular shape having a period approximately one-half the reference wavelength and an amplitude approximately one-half the reference wavelength is formed on the first surface or the second surface carrying the diffractive surface, with the micro-irregular shape being finer than the micro-irregular shape of the diffractive surface, the transmittance of the compound surface, that cannot be polished, can be 90% or higher.

With the objective lens unit of the present invention, in which a protective cover having a thickness not less than 0.3 mm is arranged between the objective lens unit and the image surface, and the spherical aberration ascribable to the protective cover is corrected, it is possible to eliminate the effect of the protective cover on the spherical aberration.

For accomplishing the above object, the present invention also provides an optical pickup comprising a laser light emitting device for radiating the laser light, an objective lens unit for converging the laser light on a recording layer of an optical recording medium, a light receiving device for receiving the laser light and an optical component for causing the laser light radiated from the laser light emitting device to incident on the objective lens unit and for causing the laser light reflected by the recording layer of the optical recording medium and transmitted through the objective lens unit to incident on the light receiving device, wherein the objective lens unit includes a resin layer having, sequentially from an object side, a first surface as an aspherical surface and a second surface as an aspherical surface, at least one of the first surface and the second surface including a diffractive surface, and a lens of glass having the second surface as an aspherical surface and a third surface as an aspherical surface. The lens unit is corrected for the chromatic aberration on an image surface on the optical axis with respect to the light of a reference wavelength not larger than 420 nm within several nm of the reference wavelength, with the numerical aperture of the lens unit being not less than 0.8.

With the present optical pickup, in which the chromatic aberration can be effectively corrected for the wavelength range within several nm about 420 nm or less as a reference, the spot diameter of the laser light can be wine-pressed close to the diffraction limit to cope with the standard for the optical recording medium in which the track pitch is narrowed to raise the information recording density.

With the optical pickup of the present invention, the working distance from the third surface of the objective lens to the image point is set to 0.5 mm or more to avoid the problem of the objective lens unit colliding against the optical recording medium to render it possible to converge the light close to the diffraction limit on the recording layer of the optical recording medium.

With the optical pickup of the present invention, in which a protective cover having a thickness not less than 0.3 mm is arranged between the third surface of the objective lens unit and the image surface, and the function of correcting the spherical aberration ascribable to the protective cover is provided, it is possible to eliminate the effect of the protective cover on the spherical aberration.

For accomplishing the above object, the present invention also provides a disc driving device for recording and/or reproducing the information for a rotating disc-shaped optical recording medium by an optical pickup movable along the radius of the optical recording medium, wherein the optical pickup includes a laser light emitting device for radiating the laser light, an objective lens unit for converging the laser light on a recording layer of an optical recording medium, a light receiving device for receiving the laser light and an optical component for causing the laser light radiated from the laser light emitting device incident onto the objective lens unit and for causing the laser light reflected by the recording layer of the optical recording medium and transmitted through the objective lens unit incident onto the light receiving device. The objective lens unit includes a resin layer having, sequentially from an object side, a first surface as an aspherical surface and a second surface as an aspherical surface, at least one of the first surface and the second surface including a diffractive surface, and a lens of glass having the second surface as an aspherical surface and a third surface as an aspherical surface. The lens unit is corrected for the chromatic aberration on an image surface on the optical axis with respect to the light of a reference wavelength not larger than 420 nm within several nm of the reference wavelength, with the numerical aperture of the lens unit being not less than 0.8.

With the disc driving device of the present invention, in which the chromatic aberration can be effectively corrected for the wavelength range within several nm about 420 nm or less as a reference, the spot diameter of the laser light can be wine-pressed close to the diffraction limit to cope with the standard for the optical recording medium in which the track pitch is narrowed to raise the information recording density.

By setting the working distance from the third surface of the objective lens to the image point to 0.5 mm or more, it is possible to avoid the problem of the objective lens unit colliding against the optical recording medium to render it possible converge the light close to the diffraction limit on the recording layer of the optical recording medium.

Other objects, features and advantages of the present invention will become more apparent from reading the embodiments of the present invention as shown in the drawings.

BRIEF DESCRIPTION OF THE DRAWINGS

FIG. 27A shows spherical aberration of an objective lens unit of still another example according to the present invention and FIG. 27B shows astigmatic aberration thereof and FIG. 27C shows distortion aberration thereof.

BEST MODE FOR CARRYING OUT THE INVENTION

Figure 1:
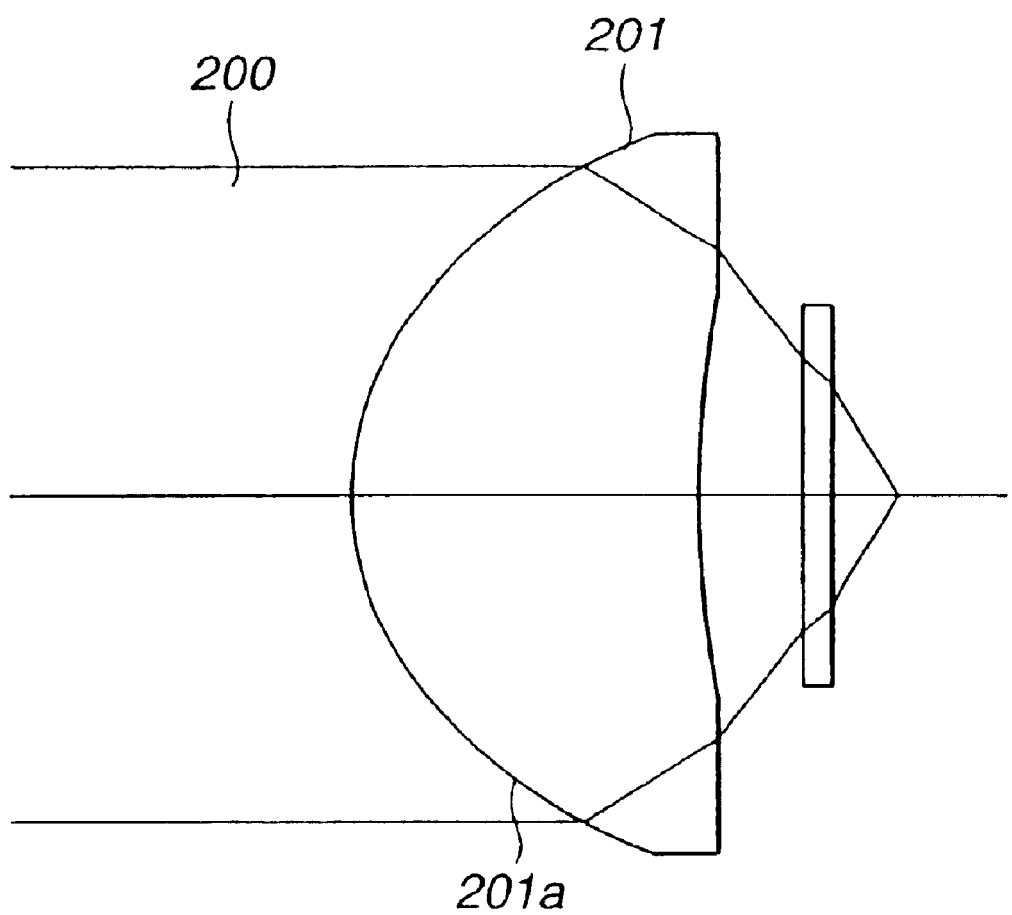
FIG. 1 is a side view showing an objective lens unit used in a conventional optical pickup.

Referring to the drawings, an objective lens unit used in an optical pickup device according to the present invention, and an optical pickup device as well as an optical pickup device employing this objective lens unit, will be explained in detail. In an embodiment of the present invention, now explained, the present invention is applied to an optical disc device configured for recording or reproducing the information for a disc-shaped optical recording medium, in which the information recording density is raised by narrowing the track pitch of the recording track, such as DVD (Digital Video Disc/Digital Versatile Disc) having a track pitch on the order of 0.6 μm which is narrower than the track pitch of the recording track provided on a Compact Disc as a disc-shaped recording medium.

First, an optical disc device, employing an optical pickup, in turn employing an objective lens unit according to the present invention, is hereinafter explained.

With the optical disc device 1, embodying the present invention, the rpm is increased to speed up the readout of recorded signals and the writing of information signals. The optical disc device 1 uses an optical recording medium having an extremely fine track pitch to increase the recording capacity, such as DVD (Digital Video Disc/Digital Versatile Disc), and is used as an external storage device, such as an information processing device, for example, a personal computer.

Figure 3:
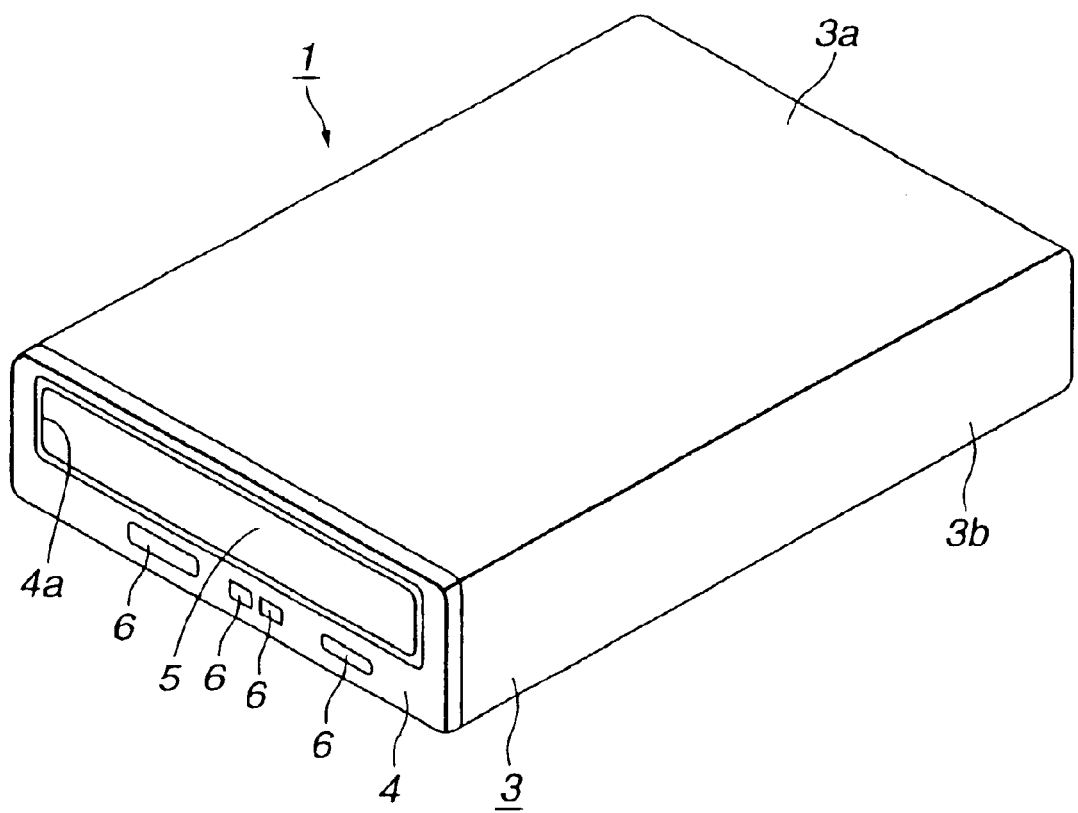
FIG. 3 is a perspective view showing the appearance of an optical disc device embodying the present invention.
Figure 4:
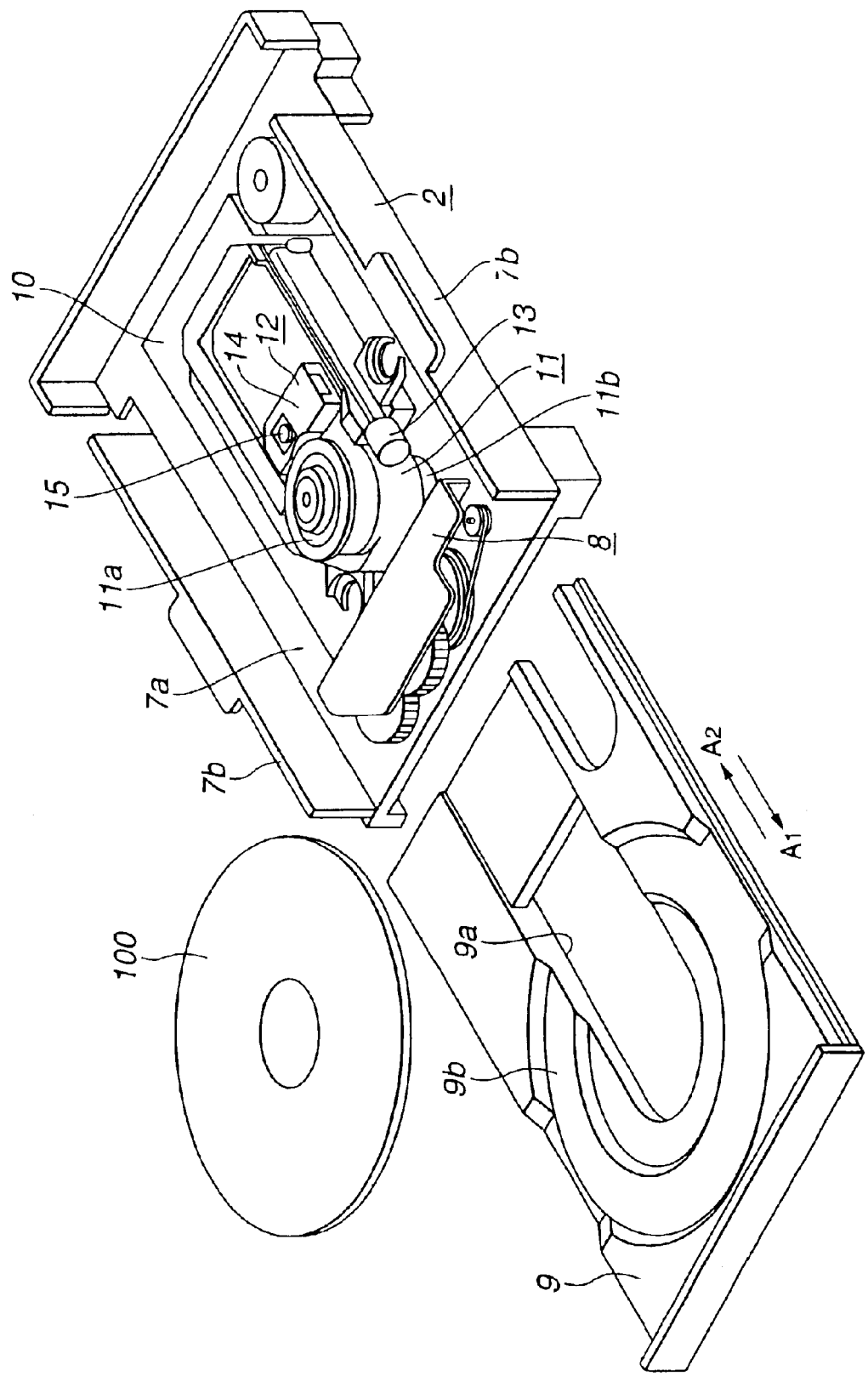
FIG. 4 is an exploded perspective view showing an inner structure of an optical disc device.

Referring to FIGS. 3 and 4, the disc driving device 1 includes a mechanical frame 2, in which a variety of operating units are accommodated. The mechanical frame 2 has its upper portion, lateral sides as well as front and rear sides covered by a cover 3 and a front panel 4.

The cover 3 is formed as one with an upper plate 3a, lateral sides 3b, 3b mounted depending from both lateral side edges of the upper plate 3a, and a rear side, not shown. In the front panel 4, there is formed a horizontally elongated opening 4a, which opening 4a may be opened and closed by a door 5 that is carried by the front panel 4 for rotation about its upper end as a fulcrum point. On the front panel 4, there are mounted a plural number of operating buttons 6 for performing various operations.

The mechanical frame 2 includes a mounting surface section 7a, on which to mount various operating units, and side portions 7b, 7b mounted upright from both lateral edges of the mounting surface section 7a. On the front end of the mounting surface section 7a, there is arranged a loading unit 8 including cam plates or gearing, not specifically shown.

On the mechanical frame 2, a disc tray 9 is carried for movement in the fore-and-aft direction, indicated by arrows $A_1$ and $A_2$, as shown in FIG. 4. In the disc tray 9, there are formed an inserting opening 9a, elongated in the fore-and-aft direction, and a disc setting recess 9b, in which to set a disc-shaped recording medium 100, referred to below simply as an optical disc. When the optical disc 100 is set in the disc setting recess 9b, the disc tray 9 is moved by the loading unit 8 so as to be protruded to outside the main body unit via opening 4a in the front panel 4. When the information is to be recorded on or reproduced from the optical disc 100, the disc tray 9 is pulled into the inside of the main body unit as the optical disc 100 is set in the disc setting recess 9b.

On the mounting surface section 7a of the mechanical frame 2, a movable frame 10 is carried for rotation about its rear end as a fulcrum of rotation, as shown in FIG. 4.

Within the movable frame 10 is mounted a motor unit 11 adapted for rotating the optical disc 100. The motor unit 11 includes a disc table 11a and a driving motor 11b. On the movable frame 10, there is mounted an optical pickup 12 for movement along the radius of the optical disc 100, loaded on the disc table 11a, by a guide shaft, not shown, and a lead screw, also not shown.

On the movable frame 10 is fastened a feed motor 13 adapted for rotating the lead screw. Thus, when the lead screw is rotated by the feed motor 13, the optical pickup 12 is moved, with the guide shaft as guide, in a direction corresponding to the rotating direction of the feed motor 13.

When the optical disc 100, set in the disc setting recess 9b of the disc tray 9, is pulled into the inside of the device, retained by suitable means on the disc table 11a and rotated along with the disc table 11a by the driving motor 11b of the motor unit 11, the optical pickup 12 of the disc driving device 1 of the present invention is moved along the radius of the optical disc 100 to record and/or reproduce the information for the optical disc 100.

The structure of the optical pickup 12 for recording and/or reproducing the information for the optical disc 100 is hereinafter explained.

Figure 5:
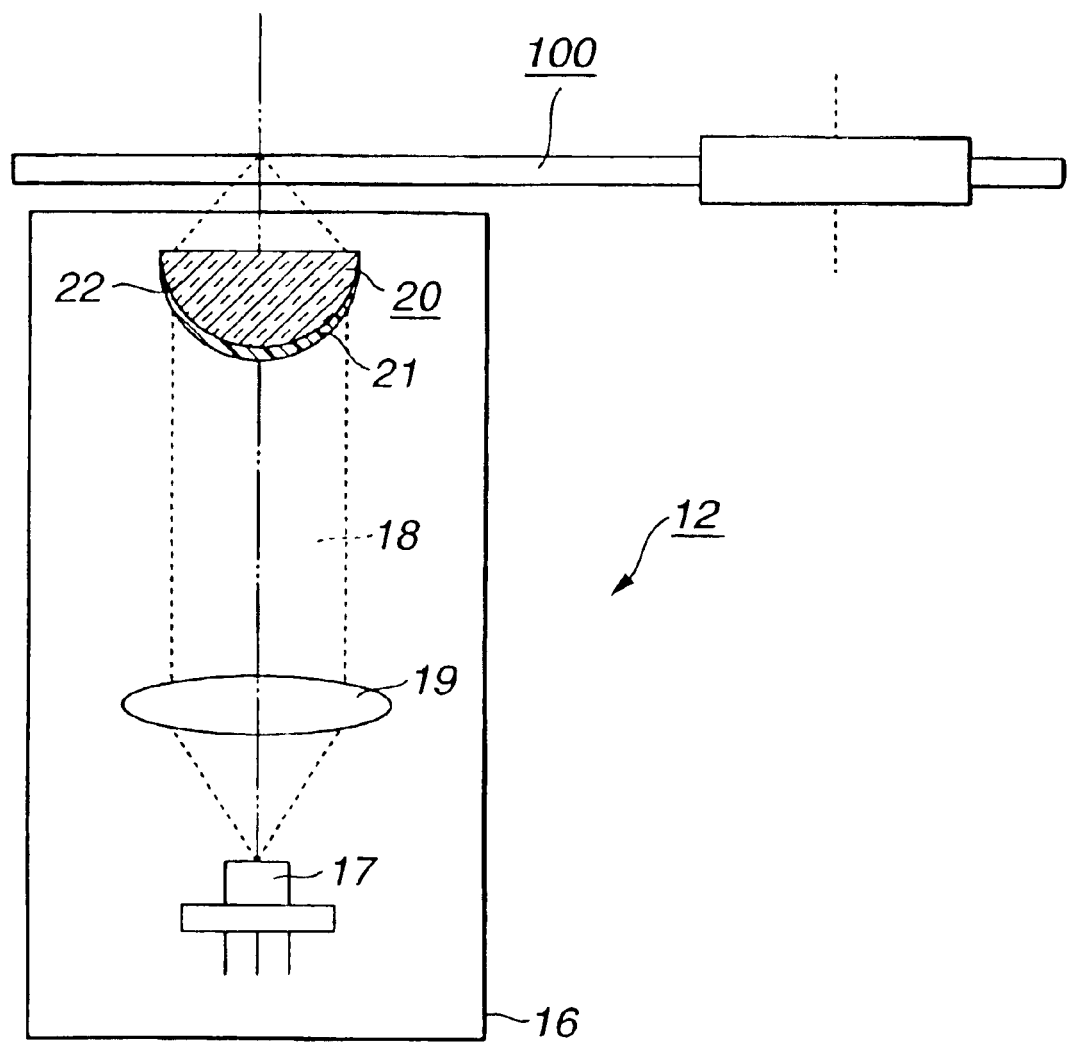
FIG. 5 is a side view showing an optical pickup according to the present invention.

The optical pickup 12 is carried for movement along the radius of the optical disc 100, and includes a biaxial actuator, not shown, carried on a housing 16, as shown in FIG. 5. Within the housing 16, there are mounted a laser light emitting unit 17 and a collimator lens 19 for collimating a laser light beam 18 radiated from the laser light emitting unit 17. Within the housing 16, there is also mounted an objective lens unit 20 held by a biaxial actuator, not shown. The objective lens unit 20 includes a chromatic aberration correction mechanism adapted for converging the laser light 18 on the recording layer of the optical disc 100.

The optical disc 100, with a narrow track pitch of the order of 0.6 μm, is comprised of a substrate of a thin thickness of a standard for coping with high recording density. The optical pickup 12 is adapted for recording and/or reproducing the information for this optical disc 100. Consequently, the laser light emitting unit 17 emits the laser light beam 18 of a wavelength on the order of 400 to 410 nm which is shorter than the wavelength of 780 nm of the conventional CD standard. The wavelength of the laser light beam 18 is varied in a short period by superimposing the high frequency current on the driving current for diminishing the laser noise.

In effecting recording on a recording layer of an optical disc, the high energy laser light beam 18 is radiated from the laser light emitting unit 17. The laser light beam 18 is collimated by a collimator lens 19 and converged by the objective lens unit 20 on the recording layer of the optical disc 100 to form pits by for example phase changes for recording the information thereon.

In reading out the recorded information, the laser light beam 18 of a lower energy than that of the laser light used for information recording is illuminated on the recording layer of the optical disc 100. The information recorded may be read out as the laser light beam 18 reflected back from the optical disc 100 is detected by a light receiving system provided in the optical pickup 12, such as a beam splitter, not shown.

The optical pickup 12 is designed so that the laser light beam 18 illuminated on the optical disc 100 will be varied for diminishing the laser noise. Thus, by the objective lens unit 20, it is possible to produce a beam spot improved in chromatic aberration at the time of converging the light on the optical disc and which is small in size to near the limit of diffraction.

The objective lens unit 20, designed to have a function of correcting the chromatic aberration, is now explained in detail.

Figure 6:
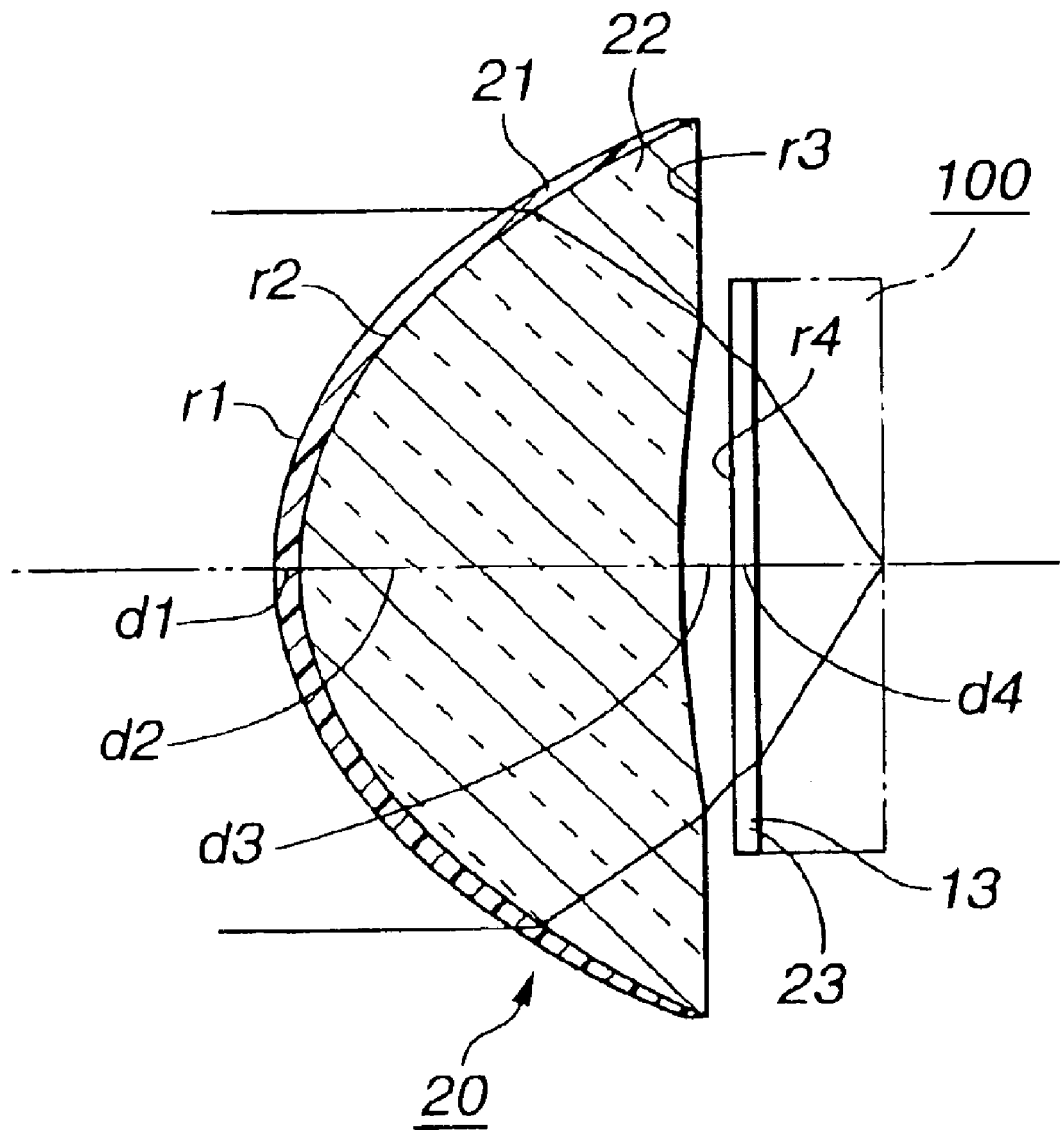
FIG. 6 is a longitudinal cross-sectional view showing an objective lens unit of the present invention.

Referring to FIGS. 5 and 6, the objective lens unit 20 is made up by a resin layer 21, having a first surface, as a surface on which incidents the laser light beam 18 radiated from the laser light emitting unit 17, configured as a phase type diffraction optical lens of a so-called blaze shape, and by a single aspherical optical lens of glass 22 having a large power. In more detail, the objective lens unit 20 is made up by the resin layer 21 having an aspherical first surface r1, including a diffraction lens, and an aspherical second surface r2, having an aspherical surface, and by the aspherical single lens of glass 22, having the aspherical second surface r2 and an aspherical third surface r3, looking from the object side.

The first surface r1 of the blaze shape is formed by any suitable method, such as forming the resin layer by metal die forming, as a so-called blazed hologram having for example a serrated cross-section.

It is preferred that the working distance between the last lens surface r3 and an image point is not less than 0.5 mm, the base surface (=r2) which defines a diffractive type lens, necessarily has a value of the aspherical coefficient, and that the aspherical surface of the first surface r1 and that of the second surface r2 are of the same radius of curvature of the base and the same spherical coefficient.

In general, the achromatizing conditions of the lens unit, comprised of a refractive type lens and a diffractive type lens, with respect to a light source, the wavelength of which is varied within a range of ±δ (nm) with respect to the wavelength λ (nm), may be derived as follows:

If the values of the refractive index of a vitreous material for wavelengths of λ, λ+δ and λ−δ are N, N+δ and N−δ, respectively, the partial Abbe degree within the range of the wavelength of λ±δ may be defined as follows:

That is, the partial Abbe number vr of the refractive type lens is given by the following equation (1):

$$v = \frac{N-1}{N_{+\delta} - N_{-\delta}} \quad (1)$$

while the partial Abbe number vd of the diffractive type lens is given by the following equation (2):

$$v = \frac{\lambda}{(\lambda + \delta) - (\lambda - \delta)}. \tag{2}$$

If the focal lengths of the refractive type lens and the diffractive type lens are $f_r$, $f_d$, respectively, the combined focal length f of the combined lens is represented by the following equation (3):

$$\frac{1}{f} = \frac{1}{f_r} + \frac{1}{f_d} \tag{3}$$

while the achromatizing condition for an image point on the optical axis is represented by the following equation (4):

$$f_r \cdot v_r + f_d \cdot v_d = 0 \tag{4}$$

Consequently, the following equation (5):

$$f_r = f\left(1 - \frac{v_d}{v_r}\right)$$
$$f_d = f\left(1 - \frac{v_r}{v_d}\right) \tag{5}$$

may be derived from the equations (3) and (4).

The diffractive type lens, constituted by the resin layer 21, is of the phase transmission type, and has a surface shape of a blazed hologram having a saw-tooth-like or serrated cross-section. The blaze width of the diffractive type lens becomes narrower along a direction proceeding from the center optical axis towards the lens rim. If the smallest line width, which is the width of the narrowest portion of the blaze, is w, the relation between the radius R of the laser light beam 18, focal length $f_d$ of the diffractive type lens and the wavelength λ of the laser light beam 18 is approximately represented by the following equation (6):

$$f_d = \frac{\omega \cdot R}{\lambda}. \tag{6}$$

Meanwhile, the optical pickup 12 includes the laser light emitting unit 17, having the wavelength λ=405 nm and wavelength variations δ within 2 nm, as a light source, with the light beam diameter φ of 3 mm and with the numerical aperture (NA) of 0.85.

Figure 7:
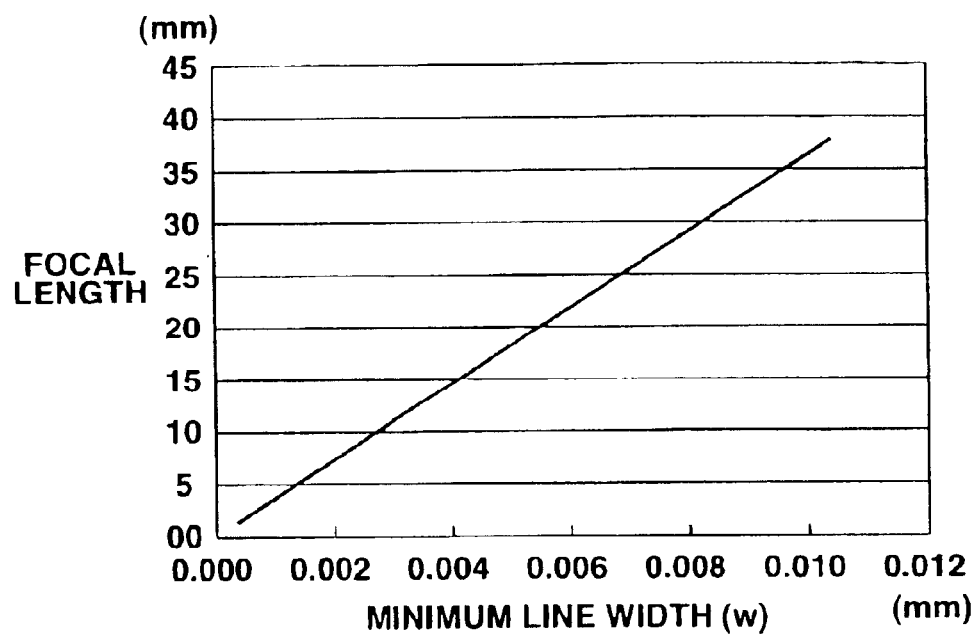
FIG. 7 is a graph showing the relation between the minimum line width w of a blaze and a focal length $f_d$ in a diffraction lens.

FIG. 7 depicts a graph showing the relation between the minimum line width w of the blazed hologram and the focal length $f_d$ of a diffractive type lens $L_1$, using the equation (6). On the other hand, FIG. 8 depicts a graph showing the relation between the partial Abbe number $v_f$ of the vitreous material of the refractive type lens $L_2$, the focal length $f_r$ of the refractive type lens $L_2$ and the focal length $f_d$ of the diffractive type lens $L_1$, using the equation (5).

That is, if, in FIG. 7, the minimum line width w of the blaze is 2 μm, 3 μm or 4 μm, the focal length $f_d$ of the diffractive type lens $L_1$ is 7.40 mm, 11.1 mm or 14.8 mm, respectively. Since the power of the lens is a reciprocal of the focal length, these values of the focal length represent the most important measure of the power possible with the diffractive type lens $L_1$.

Figure 8:
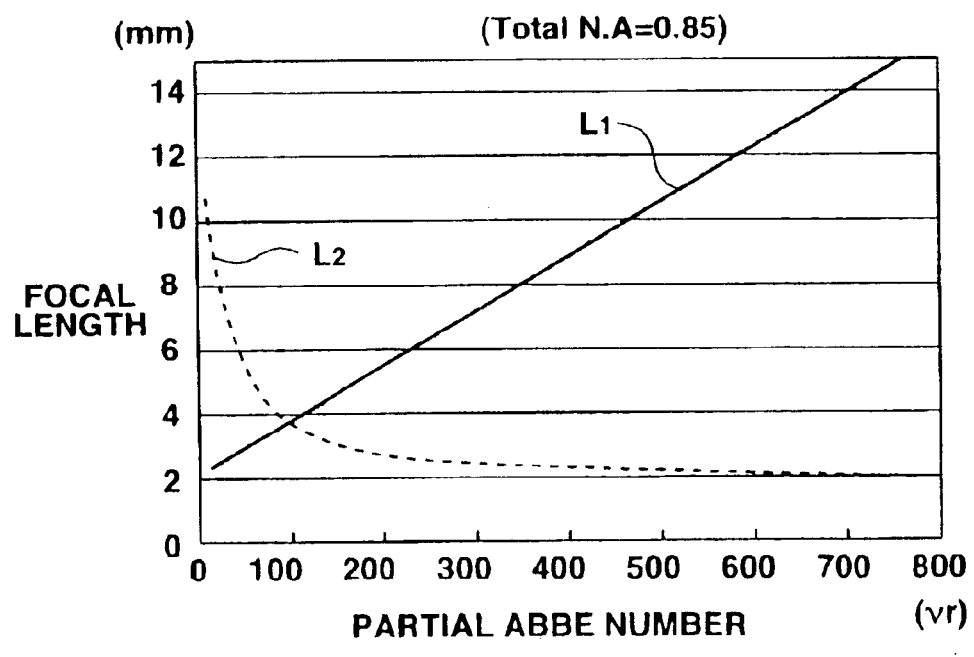
FIG. 8 is a graph showing the relation between the partial Abbe number of the vitreous material forming a refractive type lens, the focal length thereof and the focal length of the diffraction type lens.

If, in FIG. 8, the smallest value of the focal length $f_d$ of the diffractive type lens $L_1$ is 7.40 mm, the partial Abbe number $v_r$ of the refractive type lens $L_1$ of the vitreous material of the refractive type lens is allowed in a range not less than 325. In similar manner, the effective ranges of the partial Abbe number $v_r$ of the refractive type lens $L_2$ when the focal length $f_d$ of the diffractive type lens $L_1$ is 11.1 mm and 14.8 mm is not less than 540 and not less than 750, respectively.

Thus, it is sufficient to select such a vitreous lens material forming the lens of glass 22 of the objective lens unit 20 which satisfies the above-mentioned conditions of the minimum line width w of the blaze and which can be prepared on glass mold casting. For example, if the lens of glass 22 is formed of LAH53 (trade name of a product by OHARA Inc., the partial Abbe number is of the order of 630, such that, by combining the lens of glass with the diffractive type lens with the minimum line width of the order of 3 μm, it is possible to achromatize an image point.

In this manner, if the numerical aperture NA, the light beam diameter φ (=2R) and the light source to be in used are determined, the focal length f of the objective lens unit 20 of the present invention, formed as the combined lens, and the Abbe number $v_d$ of the diffractive type lens $L_1$ are determined. Moreover, if the minimum line width w of the blaze is prescribed, the effective range of the focal length $f_d$ of the diffractive type lens $L_1$ may be determined. Additionally, the effective range of the partial Abbe number $v_r$ and the focal length $f_r$ of the refractive type lens $L_2$ may also be determined from the aforementioned equation.

In general, the phase distribution φ(r) of the diffractive type lens is represented by $$\phi(r) = C_1 r^2 + C_2 r^4 + C_3 r^6 + C_4 r^8 + \ldots$$

while the relation of the following equation (7):

$$C_1 = \frac{1}{2f_d} \tag{7}$$

holds between the focal length $f_2$ and the coefficient $C_1$.

Meanwhile, the coefficient $C_1$, which is a coefficient determining the power of the refractive type lens, is a quantity equivalent to the radius of curvature of the base surface in the refractive type lens. Thus, the coefficient $C_1$ needs to be determined by the equation (7).

The radius of curvature $r_1$ of the surface of the resin layer 21 towards the laser light emitting unit 17, that is towards the light source, is selected in accordance with the following equation (8):

$$\frac{1}{r_1} \approx \frac{N \cdot (2N+1)}{2(N-1) \cdot 2(N+1) \cdot f} \tag{8}$$

in order to minimize the third order spherical aberration.

On the other hand, the radius of curvature $r_2$ of the surface towards the optical disc 100 of the resin layer 21, operating as a diffractive type lens, is determined so as to maintain the focal length $f_1$ constant, as account is taken of the required lens thickness.

The objective lens unit 20 of the present invention, having the chromatic aberration function, may be designed, based on the optimization of the bending and the aspherical coefficient, with the aforementioned conditions as the initial setting of the respective constituent lenses.

A certain numerical example, as a specified embodiment of the objective lens unit 20, is hereinafter explained.

In the following explanation, $r_i$ depicts the ith surface as counted from the laser light emitting unit 17, and the radius of curvature thereof, while $d_i$ depicts the separation between the ith surface and the (i+1)st surface as counted from the laser light emitting unit 17.

Meanwhile, the aspherical shape is defined by the following equation (9):

$$x = \frac{ch^2}{\sqrt{1 + \{1 + (1+k)c^2h^2\}}} + Ah^4 + Bh^6 + Ch^8 + \quad (9)$$
$$Dh^{10} + Eh^{12} + Fh^{14} + Gh^{16} + Hh^{18} + Jh^{20}$$

where x is a distance of a point on an aspherical surface with a height h from the optical axis from the tangential surface of the apex of the aspherical surface, c is the radius of curvature of the apex of the aspherical surface (=1/R), k is a conical constant, and A, B, C, D, E, F, G, H and J are degree four to degree twenty aspherical coefficients.

While the diffractive type lens is classified into an amplitude type and a phase type, the diffractive type lens, formed as the resin layer 21 in the present invention, is of the phase type, in particular the blazed hologram type, in light of the efficiency. This blazed hologram is specified using a polynominal for curved coordinates on a substrate as deviation coefficients of the aspherical phase on the respective surfaces when it is assumed that two point light sources at the time of manufacture are at infinitely remote points, as in the case of the routine hologram. The coefficients of the polynominal give the optical path difference (OPD) at the diffraction reference wavelength in mm.

That is, the optical path difference due to diffraction at points R from the optical axis on the diffractive type lens surface is defined by $$OPD = C_1R^2 + C_2R^4 + C_3R^6 + C_4R^8 + C_5R^{10} + C_6R^{12} + C_7R^{14} + C_8R^{16} + C_9R^{18} + C_{10}R^{20}.$$

The actual shape is changed in an interrupted fashion in order to produce the diffraction. That is, since the optical path difference between the optical path through a medium with a refractive index N and that through air is given by t(N−1), the step difference d of respective ring zones (elements) of the diffractive type lens is given by $$d = \lambda/(N-1) \cdot 10^{-3}$$

where λ is the design wavelength in nm, or its integer number multiples. That is, the surface shape of the diffractive type lens is given the depth producing, as the optical path difference, the remainder resulting from division of the optical path difference OPD by the wavelength λ.

FIG. 6 shows a lens structure of the objective lens unit 20 according to the present invention, and specifically shows a lens structure in which the aforementioned LAH53 is used as a vitreous material of the lens of glass 12. Meanwhile, a polycarbonate protective layer 23, arranged on the surface of the optical disc 100, is provided between the objective lens unit 20 and the signal recording surface of the optical disc 100 as an image surface. The following Table 1 shows numerical values of the above-described numerical example:

TABLE 1

| radius of curvature ($r_i$) | surface-to-surface distance ($d_i$) | material |
|---|---|---|
| $r_1$ = 14.0 | $d_1$ = 0.10 | resin |
| $r_2$ = 14.0 | $d_2$ = 1.50 | LAH53 |
| $r_3$ = 4.10 | $d_3$ = 0.70 | |
| $r_4$ = ∞ | $d_4$ = 0.10 | polycarbonate |
| $r_5$ = ∞ | | |

Table 2 shows degree four to degree twenty aspherical coefficients $A(C_2)$ to $J(C_{10})$ of the refractive surface and the aspherical surface of the first surface $r_1$ of the resin layer 21, aspherical second surface $r_2$ and the aspherical third surface $r_3$. In Table 2, E stands for exponential expression with 10 as base.

TABLE 2

| | $r_1$ (diffractive surface) | $r_1$ (aspherical surface) | $r_2$ (aspherical surface) | $r_3$ (aspherical surface) |
|---|---|---|---|---|
| $K(C_1)$ | −3.22E−02 | −6.11E−01 | −6.11E−01 | −10.5 |
| $A(C_2)$ | −3.71E−03 | 9.71E−03 | 9.71E−03 | −1.46E−02 |
| $B(C_3)$ | −1.35E−03 | −1.48E−04 | −1.48E−04 | −1.15E−02 |
| $C(C_4)$ | 1.49E−04 | 9.52E−04 | 9.52E−04 | 9.70E−03 |
| $D(C_5)$ | | −5.55E−04 | −5.55E−04 | 3.92E−03 |
| $E(C_6)$ | | | | −2.46E−03 |
| $F(C_7)$ | | | | −1.88E−03 |
| $G(C_8)$ | | | | −2.77E−04 |
| $H(C_9)$ | | | | 1.19E−03 |
| $J(C_{10})$ | | | | −2.97E−04 |

By the aspherical first surface r1 and the aspherical second surface $r_2$ having the same base radius of curvature and the same aspherical coefficients, the film thickness of the resin layer 21 becomes constant to improve stability against e.g., changes in temperature, as shown in the above Table 2.

Moreover, by the base surface defining the diffractive type lens necessarily having the values of the aspherical coefficients, it becomes possible to construct the resin layer 21 as the diffractive type lens in an optically well-balanced stabilized state, as shown in Table 2.

Figure 9:
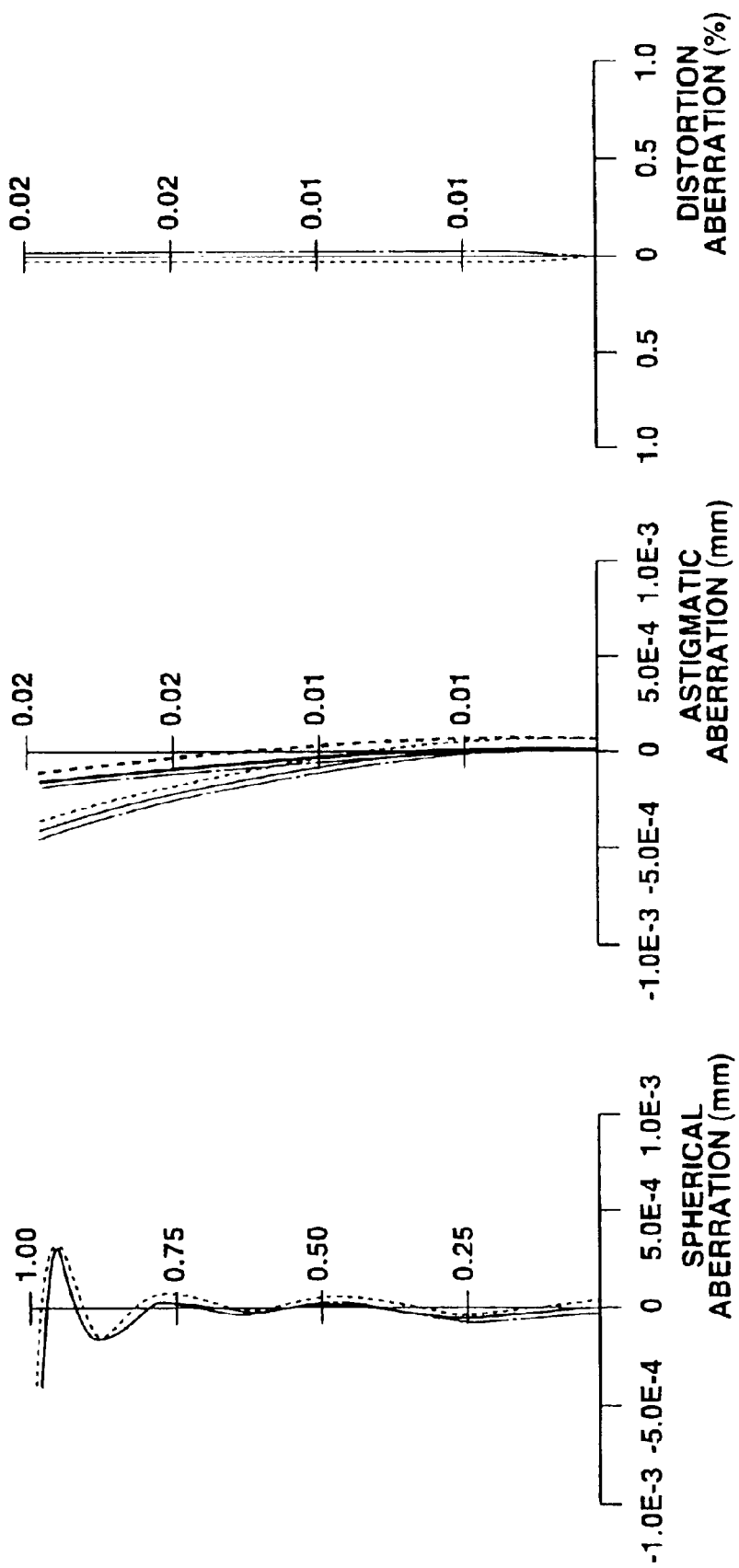
FIG. 9A is a graph showing characteristics of spherical aberration of an objective lens unit used in FIG. 1.
FIG. 9B is a graph showing characteristics of astigmatic aberration thereof and FIG. 9C is a graph showing characteristics of distortion aberration thereof.

FIGS. 9A, 9B and 9C show the spherical aberration, astigmatic aberration and the distortion aberration of the objective lens unit 20, respectively. Meanwhile, in the aberration graphs of FIGS. 9A to 9C, solid lines, dotted lines and chain-dotted lines indicate the values at 405 nm, 403 nm and 407 nm, respectively. In the astigmatic aberration graph, a thick line and a fine line denote the values on the sagittal image surface and on the tangential image surface, respectively. Meanwhile, the diffraction reference wavelength, the design wavelength and the numerical aperture are 405 nm, 405 nm (403 to 407 nm) and 0.85, respectively.

The objective lens unit 20 of the present invention has the function of correcting the chromatic aberration, and is comprised of the resin layer 21, forming the diffractive type lens, and the lens of glass 12, as an aspherical single lens, having a high light converging performance as a refractive type lens, as described above. Thus, when recording and/or reproducing the information on or from an optical disc of high recording density by the optical pickup 12 employing the objective lens unit 20, it is possible to suppress the excursions of the focal point position of the beam spot on the optical axis to approximately 0.05 μm/nm or less, thus assuring stabilized information recording and/or reproduction on the optical disc driving device 1.

The chromatic aberration on the order of ±0.6 μm/nm is produced in the conventional single lens type objective lens a, shown in FIG. 1, against variations in wavelength of the laser light of ±2 nm, whereas, with the objective lens unit 20 of the present invention, the chromatic aberration may be comprised within the range of approximately 0.01 μm/nm against similar wavelength variations of ±2 nm. It is required in general that the chromatic aberration be 0.05 μm/nm or less in an optical system, such as optical pickup. With use of the objective lens unit 10 of the present invention, it is possible to achieve sufficient performance in this respect. Consequently, with use of the objective lens unit 20, it is possible to provide an optical pickup and an optical disc driving device in which a light spot of a small diameter may be produced in keeping with the optical disc designed for high density recording.

Preferably, the working distance from the final lens surface $r_3$ of the objective lens unit 20 to the image point is not less than 0.5 mm. The reason is that, with a shorter working distance, the possibility is high that the final lens surface $r_3$ of the objective lens unit 20 is contacted with or collided against foreign matter such as dust or dirt affixed to the optical disc surface, and that, in the worst of cases, the final lens surface $r_3$ is collided against the optical disc, thus damaging both the final lens surface and the optical disc.

Since the objective lens unit 20 of the present invention guarantees effective correction fo the chromatic aberration, it is possible to provide an objective lens unit superior in recording and/or reproducing performance for the high recording density information through the use of the objective lens unit in the optical pickup having a large laser power for coping with the rewritable optical disc which is to be the mainstream of the future optical disc by having means for varying the laser power to reduce the laser noise.

With the objective lens unit 20 of the present invention, since the required power may be distributed to the refractive type lens and to the diffractive type lens, it is possible to select the power of the lens of glass 12, as the refractive type lens, to be smaller than that of the single lens of the conventional objective lens for the same vitreous material. As a result, such a designing is possible in which the radius of curvature of the base surface of the resin layer 21 forming the diffractive type lens is reduced to a lower value.

Moreover, since the objective lens unit 20 is of the single lens type in which the diffractive type lens and the refractive type lens are combined and unified together, it is possible to reduce the number of component parts as well as the overall size and to simplify the assembling step in the optical pickup and in the optical disc driving device.

Referring to FIGS. 5 and 6, the aforementioned objective lens unit 20 is made up of the resin layer 21 and the single lens of glass 22 presenting an aspherical surface, looking from the object side, in which the resin layer 21 includes an aspherical first surface r1, comprised of the diffractive type lens, and an aspherical second surface $r_2$, while the single lens of glass 12 includes an aspherical second surface $r_2$ and an aspherical third surface $r_3$. The objective lens unit 20 of the present invention is not limited to this illustrative embodiment such that the second surface $r_2$ may be formed as an aspherical surface comprised of a diffractive type lens. That is, the objective lens unit 20 may be made up of the resin layer 21 and the single lens of glass 22 presenting an aspherical surface, looking from the object side, in which the resin layer 21 includes an aspherical first surface $r_1$ and an aspherical second surface r2, comprised of the diffractive type lens, while the single lens of glass 12 includes an aspherical second surface $r_2$, comprised of the diffractive type lens, and an aspherical third surface $r_3$.

The blaze-shaped second surface $r_2$, comprised of the diffractive type lens, may be formed, as a so-called blazed hologram having a serrated cross-section, by a method of forming the resin layer by metal die casting, or by a method of machining the surface of the lens of glass.

A modified optical pickup and a modified objective lens unit used for this optical pickup are hereinafter explained by referring to the drawings.

Similarly to the optical pickup, this optical pickup 32 also includes optical components, such as light emitting unit, radiating the laser light, and a light receiving unit, and a biaxial actuator, not shown, carrying an objective lens unit 35. These optical components are loaded on a movable base unit 14 carried on a chassis 11 by the guide shaft and the lead screw, not shown.

Figure 10:
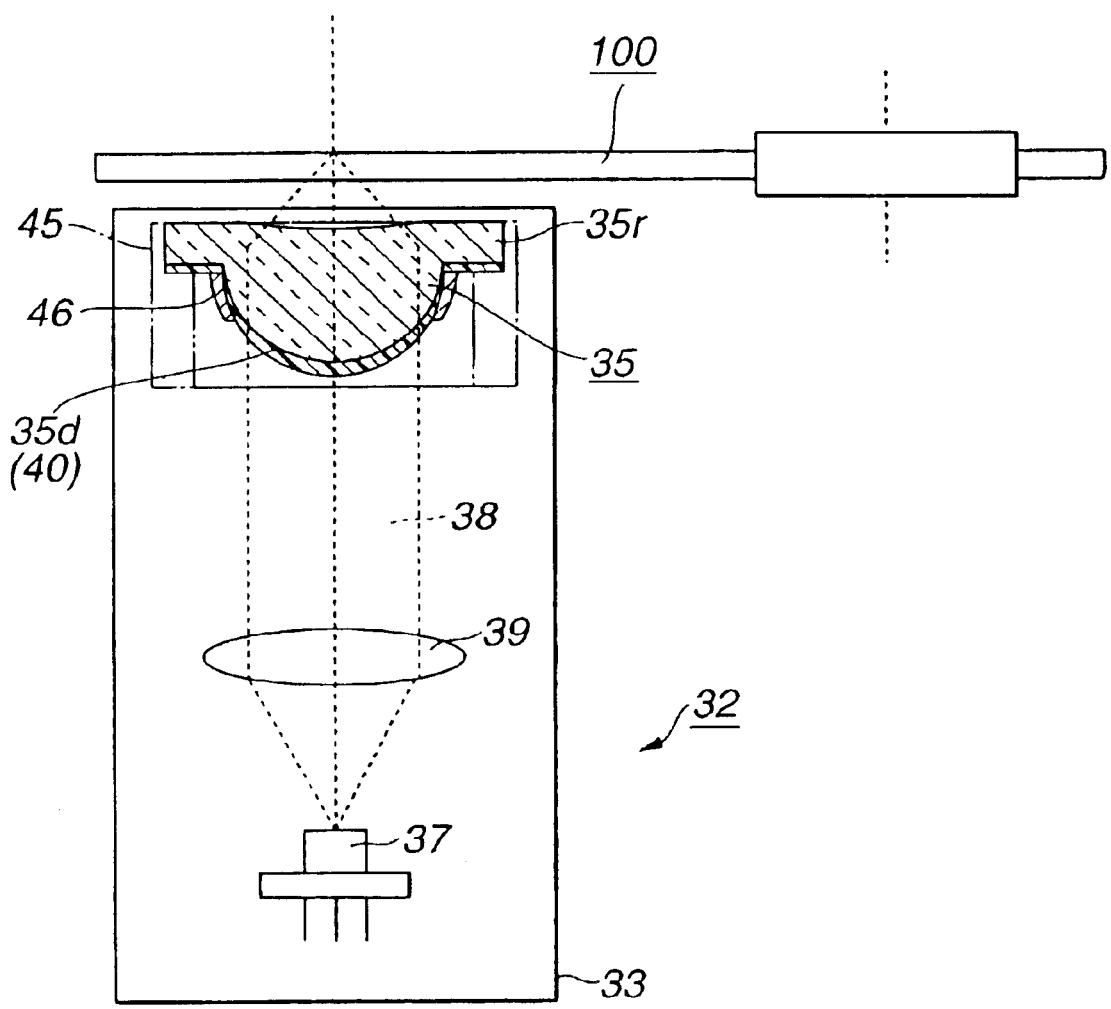
FIG. 10 is a side view showing another example of an optical pickup embodying the present invention.

Referring to FIG. 10, the optical pickup 32 is carried for movement along the radius of the optical disc 100, and includes a biaxial actuator, not shown, carried on a housing 33. Within the housing 33, there are provided a laser light emitting unit 37, radiating the laser light, and a collimator lens 39 for collimating a laser light beam 38, radiated from the laser light emitting unit 37, into a parallel light beam. The laser light beam 38, radiated from the laser light emitting unit 37, is collimated by the collimator lens 39 and converged by an objective lens unit 35 on the recording layer of the optical disc 100.

Meanwhile, the optical pickup 32 is designed for recording and/or reproducing the information for the optical disc 100 of high information recording density. Consequently, the laser light emitting unit 37 emits the laser light of a wavelength shorter than 780 nm of the laser light emitted by the conventional CD standard laser light emitting unit, that is the laser light of the wavelength of 400 to 410 nm. The laser light wavelength is varied at a shorter period of the laser light by superposing the high frequency current on a driving current for reducing the laser noise.

In effecting the recording on the optical disc 100, the high energy laser light is radiated from the laser light emitting unit 37 and collimated by the collimator lens 39 to produce the laser light beam 38 which then incidents on the objective lens unit 35 so as to be converged on the recording layer of the optical disc 100 to form a laser spot thereon. By the energy of the laser light, the recording layer undergoes e.g., phase transition to form pits corresponding to the information signals by way of recording the information signals.

In reproducing the information, recorded on the optical disc 100, the laser light of an energy lower than that in recording the information is emitted from the laser light emitting unit 37 and turned into a parallel laser light beam by the collimator lens 39. The so collimated laser light beam 38 is incident on the objective lens unit 35 and thereby converged on the recording layer of the optical disc 100 to form a laser light spot thereon. The laser light reflected back from the recording layer of the optical disc 100 is routed on an optical path, which is the reverse of the optical path followed by the incident light, so as to be detected by a light receiving system, not shown, including a light receiving element in the optical pickup 32.

The working distance of the objective lens unit 35, that is the distance between the surface of the lens of the objective lens unit 35 closest to the optical disc 100 and an image point, which is the recording layer of the optical disc 100 on which is converged the laser light, is not less than 0.5 mm.

A modified objective lens unit 35 of the present invention is now specifically explained.

Figure 11:
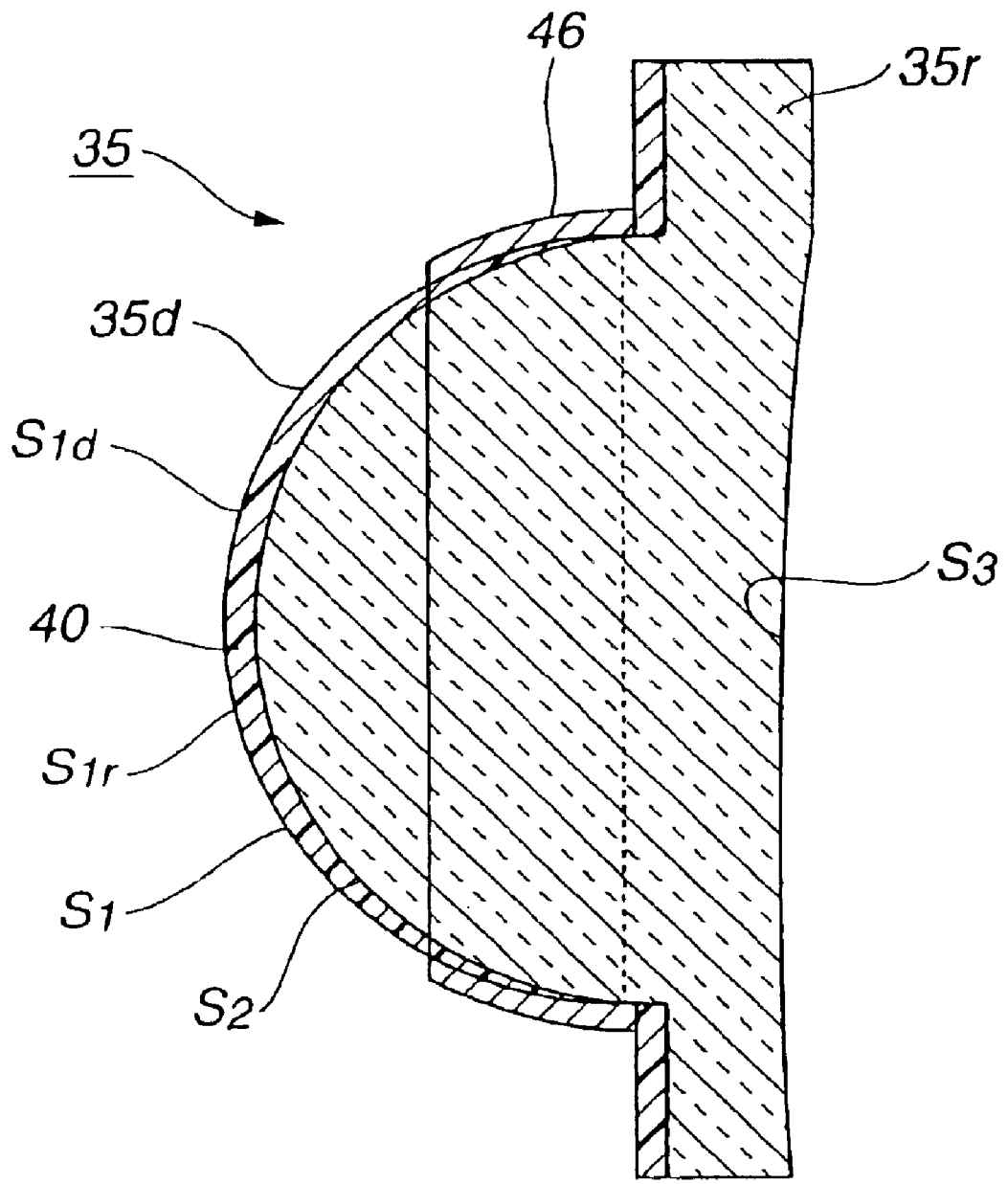
FIG. 11 is a longitudinal cross-sectional view showing another example of an objective lens unit embodying the present invention.

Referring to FIG. 11, the objective lens unit 35 includes a refraction/diffraction compound surface S1, as a first surface, a refractive type lens 35r and a compound type lens 35d.

The refractive type lens 35r is comprised of single lens of glass of a high refractive power and a meniscus shape presenting aspherical surfaces on its both sides. The compound type lens 35d is formed by a resin layer 40 comprised of a suitable resin material layered on the second surface $S_2$ as the light source side surface of the refractive type lens 35r.

The refraction/diffraction compound surface $S_1$, as a first surface, referred to below simply as compound surface, is formed by a refractive surface $S_{1r}$, as a surface of the resin layer 40, having a radius of curvature of the same aspherical shape as the surface $S_2$ of the refractive lens 35r, that is the second surface, and by adding a hologram, as a phase type diffractive surface $S_{1d}$ of the blaze shape or the so-called staircase shape, which is a type of the blaze shape, to the refractive surface $S_{1r}$, with the refractive surface $S_{1r}$ as a base surface, that is as a reference surface which defines the diffractive surface.

Thus, the objective lens unit 35 may be thought of as being comprised of a junction lens made up by the compound type lens 35d formed by the resin layer 40 and the refractive type lens 35r of glass.

The compound type lens 35d, forming the objective lens unit 35 of the present invention, performs the role of correcting the chromatic aberration, while the refractive type lens 35r performs the role of converging the laser light beam spot to a preset size.

In the following explanation, the surface numbers of the lenses and other constituent elements are counted 1, 2, 3, . . . sequentially from the light source side. Thus, $S_i$ depicts the ith surface, as counted from the light source side, $r_i$ depicts the radius of curvature of the ith surface $S_i$ as counted from the light source side, and $d_i$ depicts the surface-to-surface distance on the optical axis between the ith surface and the (i+1)st surface as counted from the light source side. The aspherical shape is defined by the following equation (10):

$$x = \frac{ch^2}{\sqrt{1 + \{1 + (1+k)c^2 h^2}} + Ah^4 + Bh^6 + Ch^8 + Dh^{10} + Eh^{12} + Fh^{14} + Gh^{16} + Hh^{18} + Jh^{20} \quad (9)$$

where x is a distance of a point on an aspherical surface with a height h from the optical axis from the tangential surface of the apex of the aspherical surface, c is the radius of curvature of (=1/R) of the apex of the aspherical surface, k is a conical constant, and A, B, C, D, E, F, G, H and J are degree four to degree twenty aspherical coefficients.

While the diffractive type optical component is classified in general into an amplitude type and a phase type, the diffractive type optical component, formed as the diffractive surface $S_{2d}$ in the present invention, is of the phase type, in particular the blazed hologram type in light of efficiency. This blazed hologram is specified using a polynominal for curved coordinates on a substrate as deviation coefficients of the aspherical phase on the respective surfaces when it is assumed that two point light sources at the time of manufacture are at infinitely remote points, as in the case of the routine hologram. The coefficients of the polynominal give the optical path difference (OPD) at the diffraction reference wavelength. That is, the optical path difference due to diffraction at points R from the optical axis on the diffractive surface is defined by $$OPD = C_1 R^2 + C_2 R^4 + C_3 R^6 + C_4 R^8 + C_5 R^{10} + C_6 R^{12} + C_7 R^{14} + C_8 R^{16} + C_9 R^{18} + C_{10} R^{20}.$$

The actual shape is changed in an interrupted fashion in order to produce the diffraction. That is, since the optical path difference between the optical path through a medium with a refractive index N and that through air is given by t(N−1), the step difference d of respective ring zones (elements) of the diffractive surface is given by $$d = \lambda/(N-1) \cdot 10^{-3}$$

where λ is the design wavelength in nm, or its integer number multiples. That is, the blaze shape of the diffractive surface gives to the surface shape the depth producing, as the optical path difference, the remainder resulting from division of the optical path difference by the wavelength λ.

The purpose of forming the compound surface $S_1$ as the first surface on the surface of the resin layer 40 layered on the light source side surface $S_2$ of the refractive type lens 35r is to enable the refraction/diffraction compound surface to be formed by layering the resin layer 40, on which has been transcribed the diffractive surface shape of the metal die even though the refractive type lens 35r is of a material that does not permit of molding with a metal die (vitreous material). Consequently, the range of selection of the material used for the refractive type lens 35r may be enlarged appreciably.

Figure 12:
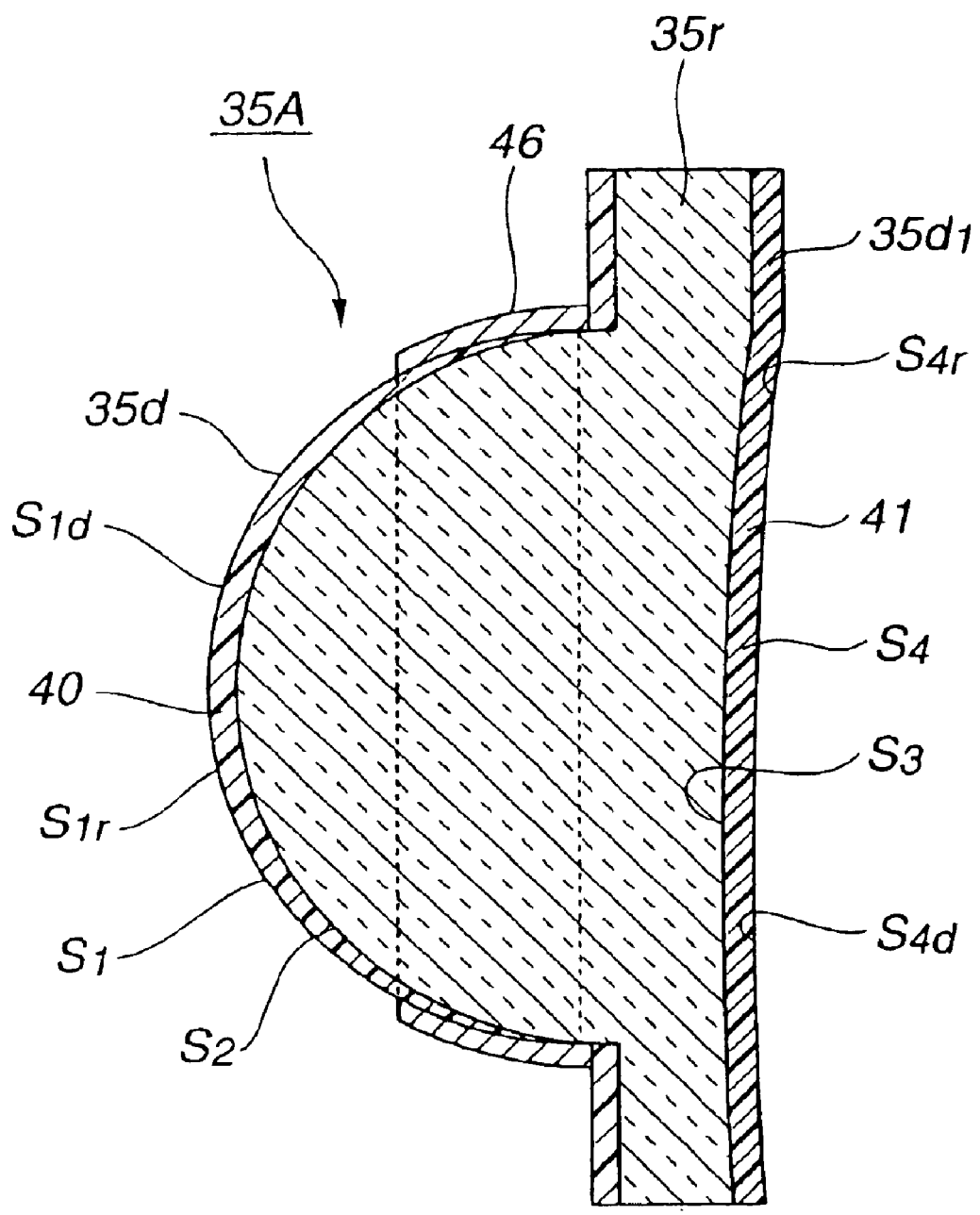
FIG. 12 is a longitudinal cross-sectional view showing still another example of an objective lens unit embodying the present invention.

The objective lens unit of the optical pickup may be configured as shown for example in FIG. 12. The objective lens unit 35A, shown in FIG. 12, is comprised of a compound type lens 35d1 annexed to the image side of the objective lens unit 35 composed of the refractive type lens 35r and the compound type lens 35d.

The refractive type lens 35r is comprised of a single lens of glass of a large refractive power and a meniscus shape presenting aspherical surfaces on its both sides. The compound type lens 35d is formed by the resin layer 40 formed in turn by layering a suitable resin material on the second surface $S_2$ which is the light source side surface of the refractive type lens 35r. The compound type lens 35d1 is formed by layering a resin layer 41 of a suitable resin material on the third surface $S_3$ Which is the image side surface of the refractive type lens 35r.

The compound surface $S_1$, as a first surface, is formed by a refractive surface $S_{1r}$, as a surface of the resin layer 40 of the compound type lens 35, having a aspherical shape of the same radius of curvature as the that of the surface $S_2$ of the refractive lens 35r, that is the second surface, and by adding a hologram, as a phase type diffractive surface $S_{1d}$ of the blaze shape or the so-called staircase shape, which is a type of the blaze shape, to the refractive surface $S_{1r}$, with the refractive surface $S_{1r}$ as a base surface, that is as a reference surface which defines the diffractive surface.

The compound surface $S_4$, as a fourth surface, is formed by a refractive surface $S_{4r}$, as a surface of the resin layer 41, having the aspherical surface of the same radius of curvature as that of the surface $S_3$ of the refractive lens 35r, and by adding a hologram, as a phase type diffractive surface $S_{4d}$ of the blaze shape or the so-called staircase shape, which is a type of the blaze shape, to the refractive surface $S_{4r}$ with the refractive surface $S_{4r}$, as a base surface, that is as a reference surface which defines the diffractive surface.

Thus, the objective lens unit 35A according to the present invention may be thought of as being comprised of a junction lens made up by the compound type lens 35d formed by the resin layer 40, refractive type lens 35r of glass and the compound type lens 35d1 formed by the resin layer 41.

The compound type lens 35d, formed by the objective lens unit 35A of the present invention, performs the role of correcting the chromatic aberration, while the refractive type lens 35r and the compound type lens 35d1 perform the roles of converging the laser light beam spot to a preset size and of improving image height characteristics of the objective lens unit, respectively.

Meanwhile, a serrated structure, corresponding to the movement trajectory of the diamond bit formed on the transcription surface of the metal die, is transcribed to the surfaces of the compound type lenses 35d, 35d1, that is the compound surface $S_1$ as the first surface and the compound surface $S_4$ as the fourth surface. In the objective lens unit 35 and 35A, the diamond bit movement is controlled during metal die production to form the serrated structure concentrically with a period on the order of one-half the reference wavelength so that the serrated structure will be coincident with the equi-phase lines of the blaze shape. The amplitude level difference of the micro-irregular structure is selected to have a thickness which will give a phase difference of the order of approximately one-half the reference wavelength.

Consequently, there is formed, on the surface of the compound surface $S_1$ of the compound type lens 35d of the objective lens unit 35 or on the surface of the compound surface $S_4$ of the compound type lens 35d or 35d1 of the objective lens unit 35A, a micro-irregular shape of a period approximately one-half of the reference wavelength in a concentric pattern with a period on the order of approximately one-half the reference wavelength.

In the objective lens unit 35A of the present invention, shown in FIG. 12, it is possible to add a hologram, which is a phase type diffraction surface of a blaze shape or a so-called step shape as one sort of the blaze shape, to the third surface S3, as a refractive surface contacting with the surface of the refractive type lens 35r of glass of the resin layer 41.

In this case, it is similarly possible to to add a hologram, which is a phase type diffraction surface of a blaze shape or a so-called step shape as one sort of the blaze shape, to the second surface $S_2$ forming a refractive surface contacted with the second surface $S_2$ of the refractive type lens 35r of glass of the resin layer 40.

By employing the compound type lens 35d or the compound type lens 35d or 35d1, as with the objective lens unit 35 or 35A according to the present invention, it is possible to increase the numerical aperture NA without increasing the lens diameter.

Each of the objective lens units 35 and 35A according to the present invention is held by a substantially cylindrically-shaped open-ended lens holder 45 of, for example, a synthetic resin material, subjected to optical adjustment, such as centering, as shown in FIG. 10. By arranging the objective lens unit 35 or 35A in the lens holder 45 from the outset, it is possible to improve the ease operation in assembling the objective lens unit 35 in the optical pickup 32.

In the objective lens units 35 and 35A of the present invention, the chromatic aberration in the image point on the optical axis is corrected for the light of a wavelength of several nm about approximately 420 nm or less as reference, and a vitreous material with a refractive index of 1.65 or higher with respect to the light of the wavelength of 420 nm or less is used for the refractive type lens 35r, while the effective focal length is set to 1.9 mm or less, and the thickness of the resin layer 40 or 41 layered on the refractive type lens 35r is set to 0.1 mm or less.

Moreover, in the objective lens unit 35 or 35A of the present invention, an aperture 46 is formed in the compound surface $S_1$ of large refractive power closest to the light source, a protective cover 42, having a thickness not larger than 0.3 mm (actually on the order of 0.1 mm) is provided between the objective lens unit and the image surface, and correction is made of the spherical aberration ascribable to the protective cover 42. Meanwhile, the aperture 46 is formed by a thin metal film of a strip shape formed in turn by vapor depositing suitable metal on the entire outer rim of the first surface $S_1$ (compound surface) of the objective lens unit 35 or 35A closest to the light source side, that is towards the object.

In the objective lens unit 35 or 35A of the present invention, the aspherical coefficient of the refractive surface $S_{1r}$ forming the compound surface $S_1$ is selected to be equal to that of the second surface $S_2$ of the refractive type lens 35r on which is layered the resin layer 40. In addition, in the objective lens unit 35A, the aspherical shape of the refractive surface $S_{4r}$ forming the compound surface $S_4$ is selected to be the same as that of the third surface $S_3$ of the refractive type lens 35r on which is layered the resin layer 41 of the refractive type lens 35r.

That is, the thickness of the resin layers 40 and 41 is extremely thin and is on the order of for example 0.1 mm and 0.01 mm, respectively, as will be explained subsequently. By the aspherical shape of the refractive surface $S_{1r}$ being equal to that of the second surface $S_2$ and by the aspherical shape of the refractive surface $S_{4r}$ being equal to that of the third surface S3, the resin layers 40 and 41 may be deemed to be of approximately the same thickness to each other. The reason is that, if the thicknesses of the resin layers 40 and 41 are approximately equal to each other, it becomes possible to minimize the site variations of the UV light illuminating conditions at the time of light exposure on the resin layer when the compound surfaces $S_1$ and $S_4$ are formed by etching the UV curable resin.

The purpose of providing the aperture 46 in the surface $S_1$ of the objective lens unit 35 or 35A of the present invention located towards the light source is to reduce the assembling error of the objective lens unit 35 and 35A with respect to the aperture 46 to zero and to restrictively use only the portions with optimum optical characteristics of the lens without using the lens rim portion to achieve a stabilized performance.

In the objective lens unit 35 and 35A of the present invention, it is preferred to use the diffracted light of the higher design order, such as second or higher order for the compound type lens 35d or 35d1. The diffractive surface $S_{1d}$ is preferably of a staircase shape in cross-section.

Additionally, the objective lens unit 35 or 35A has a distance from the last lens surface (surface closest to the image) to the image point, or the working distance, which is not less than 0.5 mm. In a conventional double type lens unit with a larger NA, for example, a solid immersion lens (SIL), the working distance is sometimes on the order of 0.1 mm. If the working distance is this short, collision of the objective lens unit against the optical disc may occur unavoidably. Thus, according to the present invention, the working distance between the last lens surface and the image point is prescribed to not less than 0.5 mm.

The achromatizing conditions (conditions of correcting the chromatic conditions), necessary for converging the laser light to the limit of diffraction in the objective lens unit 35 or 35A of the present invention, are hereinafter explained.

In general, the achromatizing conditions of the lens unit, comprised of a refractive type lens and a diffractive type lens, with respect to a light source, the wavelength of which is varied within a range of ±δ (nm) with respect to the wavelength λ (nm), may be derived as follows:

If the values of the refractive index of a vitreous material for wavelengths of λ, λ+δ and λ−δ are N, N+δ and N−δ, respectively, the partial Abbe number within the range of the wavelength of λ±δ may be defined as follows:

That is, the partial Abbe number $v_r$ of the refractive type lens is given by the following equation (11):

$$v = \frac{N-1}{N_{+\delta} - N_{-\delta}} \tag{11}$$

while the partial Abbe number $v_d$ of the diffractive type lens is given by the following equation (12):

$$v = \frac{\lambda}{(\lambda+\delta)-(\lambda-\delta)}. \quad (12)$$

If the focal lengths of the refractive type lens and the diffractive type lens are $f_r$, $f_d$, respectively, the combined focal length f of the combined lens is represented by the following equation (13):

$$\frac{1}{f} = \frac{1}{f_r} + \frac{1}{f_d} \quad (13)$$

while the achromatizing condition for an image point on the optical axis is represented by the following equation (14):

$$f_r \cdot v_r + f_d \cdot v_d = 0 \quad (14).$$

Thus, from the above equations (13), (14), the focal length $f_r$ of the refractive type lens and the focal length $f_d$ of the refractive type lens, shown in the following equation (15):

$$f_r = f \cdot \frac{1-v_d}{v_r} \quad (15)$$

$$f_r = f \cdot \frac{1-v_r}{v_d}$$

are derived.

Meanwhile, the partial Abbe number $v_r$ of the refractive type lens is determined by the refractive index of the lens material, while the partial Abbe number vd of the diffractive type lens is determined by the working wavelength of the laser light. If the fact that the refractive index of the lens material is changed with the wavelength is considered, it may be said that the partial Abbe number $v_r$ of the refractive type lens is determined by the lens material and by the working wavelength of the laser light and that the partial Abbe number $v_d$ of the diffractive type lens is determined solely by the working wavelength of the laser light.

The on-axis achromatizing conditions of the compound lens unit composed of the refractive type lens and the diffractive type lens, such as is the objective lens unit 35 according to the present invention, are uniquely determined by determining the working wavelength λ of the laser light, the oscillations of the laser light, that is wavelength variations δ, lens material, beam diameter of the incident laser light and the numerical aperture NA.

Thus, in the case of the objective lens unit for an optical pickup, the design parameter of the laser light, beam diameter of the laser light and the numerical aperture of the objective lens unit represent fixed parameters, so that, if once the lens material is determined, the on-axis achromatizing conditions of the refraction/diffraction compound lens are determined. For example, if NA=0.8, the beam diameter of the laser light is 3 mm, λ=410 nm, δ=±10 nm and LAH53 (trade name of a product of OHARA Inc.) is used as the lens material, the focal length fr of the refractive type lens 35r is 2.18 mm, with the focal length $f_d$ of the diffractive type lens 35d being 13.31 mm.

The shape of the refractive type lens 35r, as a single lens presenting aspherical surfaces on its both sides, for the objective lens unit 35 or 35A according to the present invention, is hereinafter explained.

As the parameters quantitatively determining the shape of the single lens, there are in general a shape factor q and a position factor p, these being defined by the following equation (16):

$$q = \frac{r_3 + r_2}{r_3 - r_2} \quad (16)$$

$$p = \frac{s'-s}{s'+s}.$$

In the above equation (16), r2 and r3 depict the radii of curvature of the first and second surfaces of the single lens 35r, respectively, while s and s' depict the distance between objects and the distance between image points, respectively.

It should be noted that the single lens 35r forming the objective lens unit 35 according to the present invention is a plano-concave lens and a double-convex lens when the value of the shape factor q is ±1 and in a range from −1 to 1, respectively. If the value of the shape factor q is different from these values, the single lens 35r becomes of the meniscus shape. As for the position factor p, s=∞, while s'=−1 because it is equal to the focal length f. Consequently, the degree three spherical aberration and coma aberration may be represented by the quadratic function and the linear function of the shape factor q, respectively. If the shape factor q which locally minimizes the degree three spherical aberration is q_SA and the shape factor q which sets the degree three coma aberration to zero is q_CM, these may be represented by the following equation (17):

$$q_{\_SA} = \frac{-2p(n^2-1)}{n+2} \quad (17)$$

$$P_{\_CM} = \frac{-p(2n+1)\cdot(n-1)}{n+1}$$

where n is the refractive index of the vitreous material.

If the equation (17) representing q_SA is thought of as a quadratic equation for n, q_SA is larger at all times than 1 (q_SA>1) when the vitreous material with the refractive index n not less than 1.686 is selected, thus indicating that the lens shape which renders the degree three spherical aberration locally minimum is the meniscus. In addition, if the equation (17) representing q_CM is thought of as the quadratic equation for n, q_CM is larger at all times than 1 (q_CM>1) when the vitreous material with the refractive index n not less than 1.618 is selected, thus indicating that the lens shape which reduces the degree three coma aberration to zero is the meniscus.

If, with the use of the vitreous material with the refractive index not less than 1.686, the lens shape is the meniscus, it is possible to minimize the degree three aberration. For example, if the aforementioned LAH53 with a high refractive index (n=1.83) is used, q_SA and q_CM are equal to 1.237 and 1.378, respectively.

Thus, the value of the shape factor q is not less than 1, such that the lens shape is the meniscus, with which the degree three spherical aberration can be minimized and the coma aberration may be reduced to zero.

Using the shape factors q_SA and q_CM, as calculated, and the formula of the lens manufacturer, the radii of curvature r2 and r3 of the first and second lens surfaces may be represented as indicated by the following equation (18):

$$r_1 = \frac{2f(n-1)}{q+1} \quad (18)$$

$$r_2 = \frac{2f(n-1)}{q-1}$$

where q, f and n depict the shape factor, focal length and the refractive index of the vitreous material, as described above, respectively.

Consequently, with the refractive type lens 35r used for the objective lens unit 35, the radii of curvature of the respective surfaces may be found using the above equation (18) and respective values may be determined by bending.

The shape of the compound surface $S_1$ of the objective lens unit 35 and the shape of the compound surfaces $S_1$ and $S_4$ of the objective lens unit 35A, formed by producing the shape of transcription of a compound surface, produced on adding a diffractive surface to a refractive surface of a transcription surface of a metal die 52 by machining on a lathe employing a diamond bit, and by transcribing the shape of transcription to the resin layer 40, is now explained. Although the following description is relative to the process of forming the compound surface $S_1$ of the objective lens unit 35 or the objective lens unit 35A, the process of forming the compound surface $S_4$ of the objective lens unit 35A is basically the same as that of forming the transcription surface of the compound surface $S_1$, so that the description of the process for forming the transcription surface $S_4$ of the objective lens unit 35A is omitted for simplicity.

Figure 13:
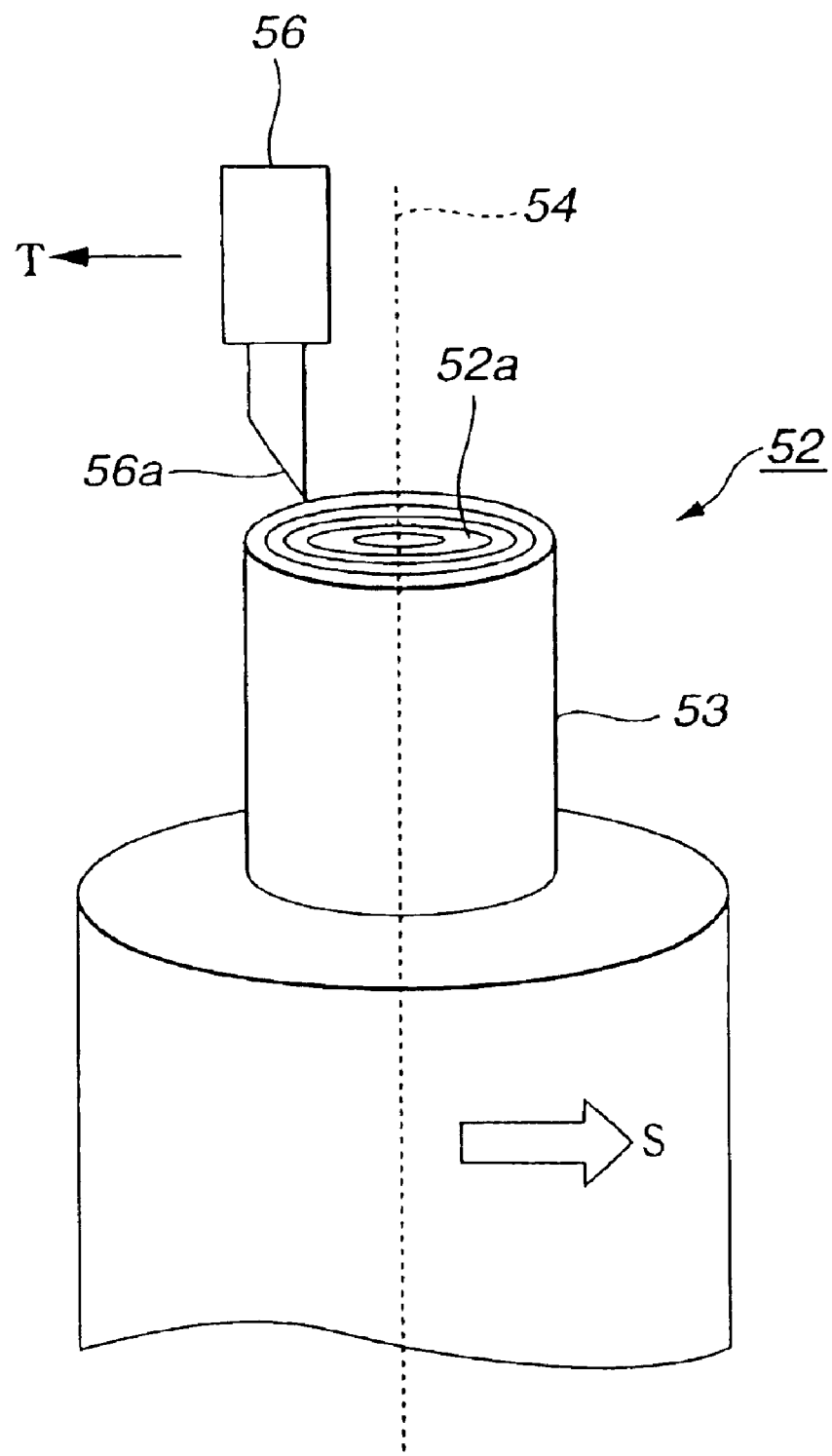
FIG. 13 is a schematic perspective view for illustrating the preparation of a blaze type diffraction surface obtained by machining employing a diamond bit.

The manner of producing the transcription surface of the compound surface $S_1$ is shown in FIG. 13, in which a blank 23 as a metal die material is rotated about an axis of rotation 54 of the lathe, in a direction indicated by arrow S, while a diamond bit 56, referred to below simply as bit, is moved in the direction indicated by arrow T. As the bit is moved in the up-and-down direction, there is produced a metal die 52, on a transcription surface 52a of which has been formed a compound surface composed of the refractive surface added by the shape of the diffractive surface (shape of a diffraction grating).

FIGS. 14A to 14E show the shape of an end 56a of a bit 56, and a transcription surface of the metal die, to an enlarged scale, in which the transcription surface has been obtained by forming a diffractive surface on the aspherical base surface, by the bit 56, with the base surface and the diffractive surface having respective different radii of curvature.

Figure 14A:
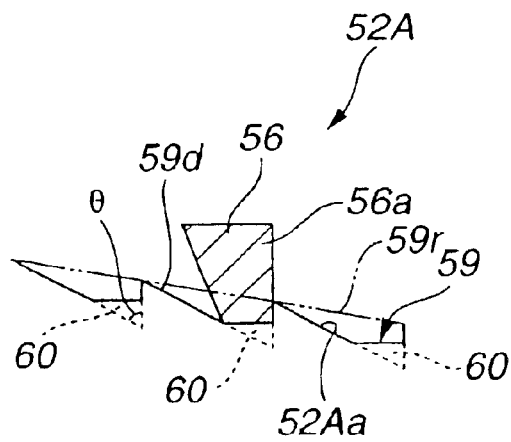
FIGS. 14A to 14E are schematic longitudinal cross-sectional views for illustrating the preparation of a blaze type diffraction surface by machining employing a diamond bit.

FIG. 14A shows, in cross-sectional view, the manner of machining, by the bit 56, the composite surface (transcription shape) 59, comprised of addition on a transcription surface 52Aa of a metal die 52A of the diffraction surface 59d, having a positive refractive power, with the refractive surface 59r, having the positive refractive power, as the base surface. In this composite surface 59, the direction of tilt of the refractive surface 59r is the same as that of the diffraction surface 59d, and the blaze angle θ of the composite surface 59 is acute, so that a non-machinable portion 60 is formed that cannot be machined by the end 56a of the bit 56 which rigorously cannot be sharpened in desired manner.

Figure 14B:
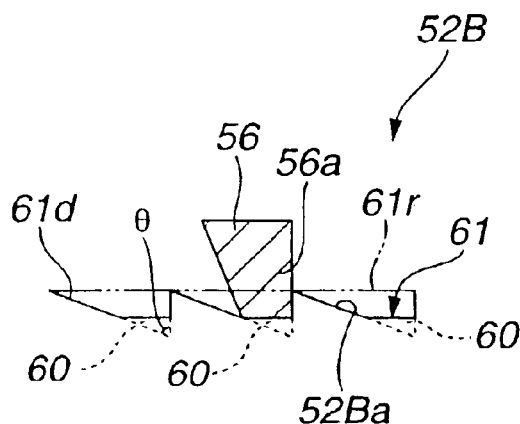

FIG. 14B shows the cross-sectional shape when a compound surface (transcription shape) 61 composed of the diffraction surface 61d of the positive refractive power added to the refractive surface 61r, as a base surface, is cut with a bit 56 on transcription surface 52Ba of a metal die 52B, with the refractive surface 61r being a surface having the zero refractive power. Since the blaze angle θ on this compound surface 61 is again acute, a non-machinable portion 60 is again formed that cannot be machined by the end 56a of the bit 56.

Figure 14C:
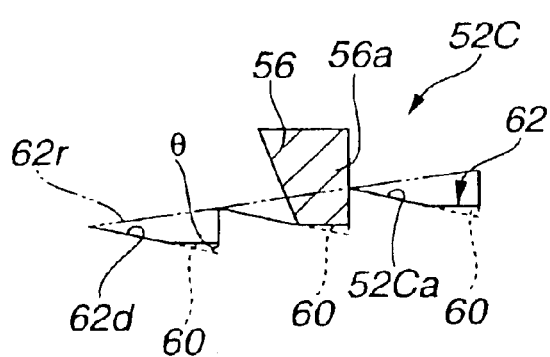

FIG. 14C shows the cross-sectional shape when a compound surface (transcription shape) 62 composed of the diffraction surface 62d of the positive refractive power added to the refractive surface 62r of the negative refractive power is cut with a bit 56 on the transcription surface 52Ca of a metal die 52C, with the refractive surface 62r as a base surface. On this compound surface 62, the direction of tilt of the refractive surface 62r is reversed to that of the diffractive surface 62d. However, the tilt of the diffractive surface 62d is larger than that of the refractive surface 62r, so that the blaze angle θ of the compound surface 62 is acute and hence a non-machinable portion 60 is again formed that cannot be machined by the end 56a of the bit 56.

Figure 14D:
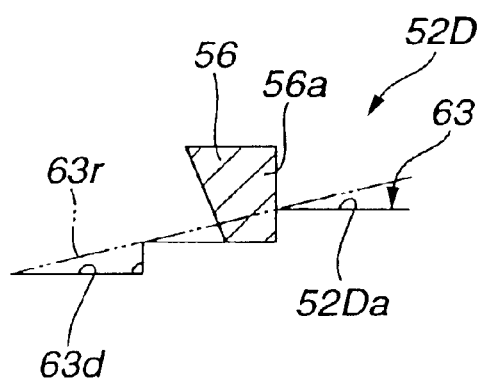

FIG. 14D shows the cross-sectional shape when a compound surface (transcription shape) 63 composed of a diffraction surface 63d of the positive refractive power added to the refractive surface 63r of the negative refractive power as a base surface is cut with a bit 56 on a transcription surface 52Da of a metal die 52D. On this compound surface 63, the direction of tilt of the refractive surface 63r is reversed to that of the diffractive surface 63d, while the blaze angle θ of the compound surface 63 is right-angled and hence the blaze shape can be machined in its entirety such that there is no risk of non-machined portions being produced that cannot be machined by the end 56a of the bit 56.

Figure 14E:
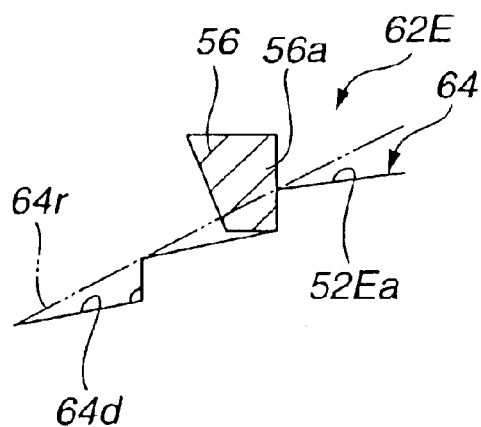

FIG. 14E shows the cross-sectional shape when a compound surface (transcription shape) 64 composed of a diffraction surface 64d of the positive refractive power added to refractive surface 64r having the positive refractive power as a base surface is machined on a transcription surface 52Ea of a metal die 52E. In this compound surface 63, the direction of tilt of the refractive surface 64r is reversed to that of the diffractive surface 64d, while the tilt of the diffractive surface 64d is smaller than that of the refractive surface 64r and the blaze angle θ of the compound surface 64 is right-angled, so that the blaze shape can be machined in its entirety and hence there is no risk of non-machined portions being produced that cannot be machined by the end 56a of the bit 56.

Figure 15:
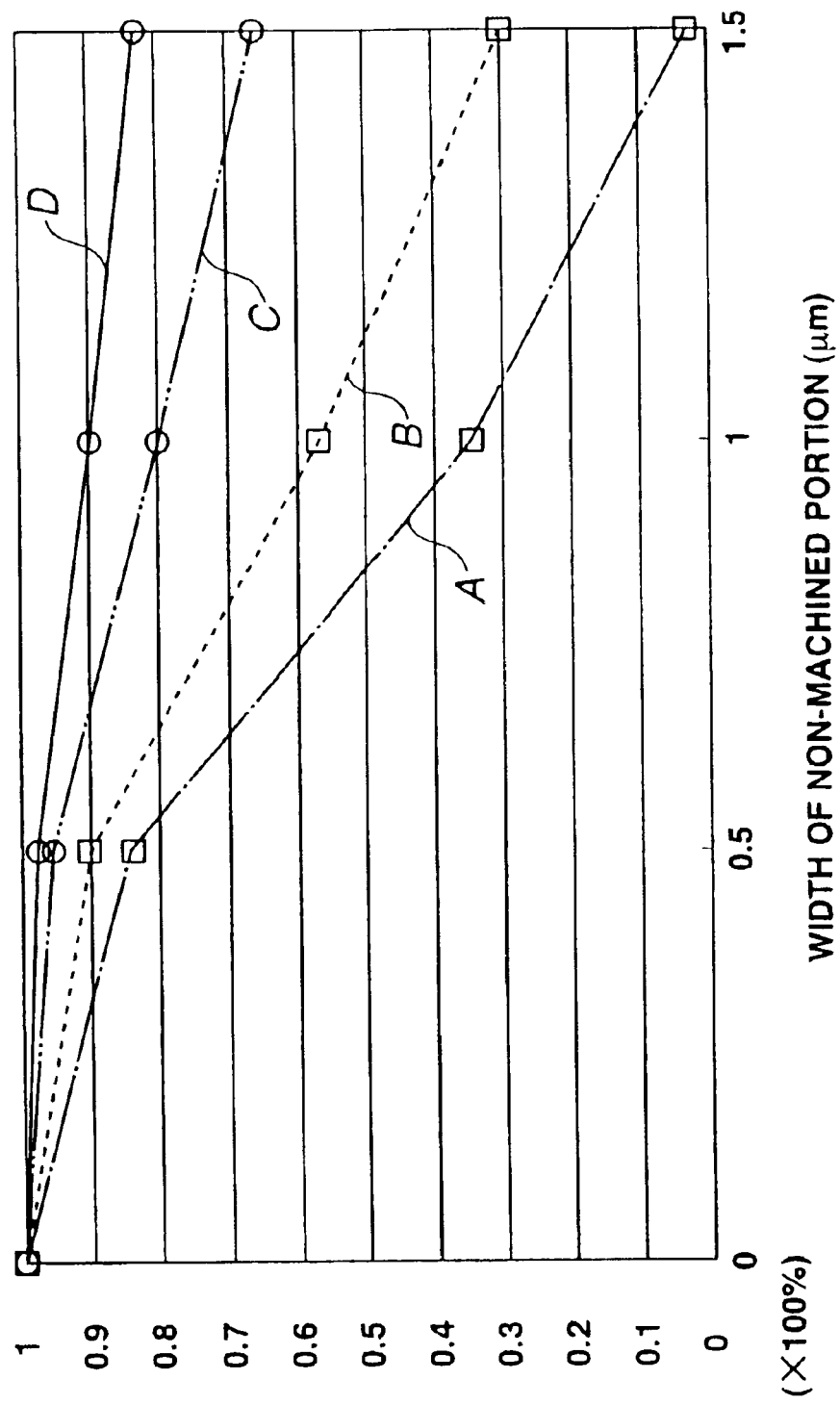
FIG. 15 is a graph showing the relation between the diffraction efficiency and the width of an non-scraped portion produced in forming a blaze type diffraction surface by machining employing a diamond bit.
Figure 16:
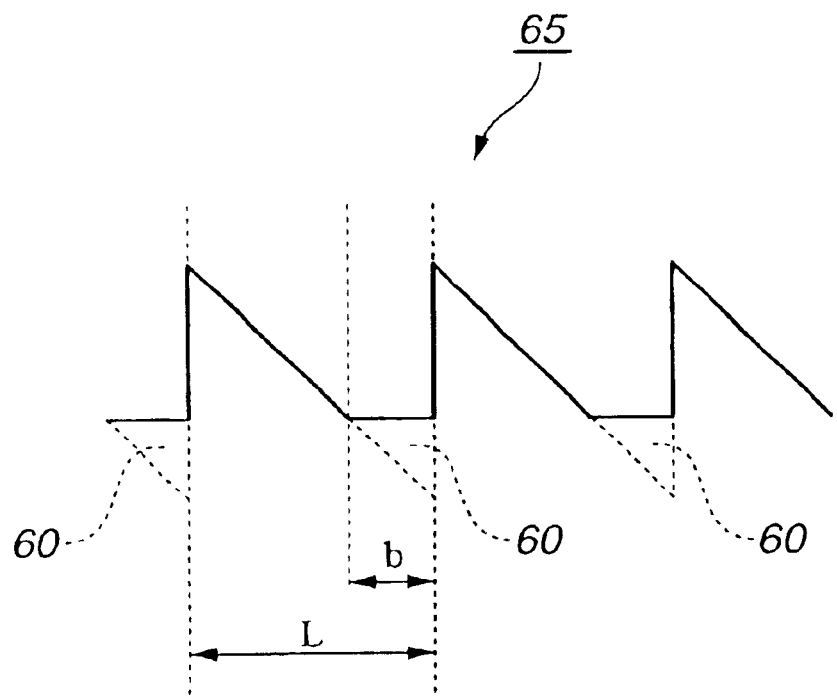
FIG. 16 is a schematic longitudinal cross-sectional view showing a blaze type diffraction surface used in computing the numerical values shown in FIG. 15.

The graph of FIG. 15 shows the relation between the design degree of orders for a constant angle of diffraction of the diffractive surface, the quantity or width b of the non-machined portion of the non-machinable portion left over uncut by the bit 56 of the blaze shape 65, having the constant period L shown in FIG. 16, and the diffraction efficiency, represented as the ratio which is 100 for b=0. FIG. 16 shows the computed results of the diffraction efficiency, computed with the diffraction angle of the first order diffracted light of 11.7°, as a measure, for the wavelength of the laser light of 405 µm and for the minimum blaze width of 2 µm.

That is, in FIG. 15, if the width of the non-machined portion is 0 µm, the diffraction efficiency is 100%, without regard to the number of orders. If the width of the non-machined portion is 1 µm, the diffraction efficiency A of the first order light is 40% or less. Thus, it may be seen that, if, under this situation, the diffraction efficiency is to be 90% or higher, the design degree of orders has to be ten or higher.

In FIG. 15, B, C and D stand for the diffraction efficiency for the secondary light, that for the degree five light and that for the degree ten light, respectively.

Thus, in the case of, for example, the compound surfaces 59, 61 and 62, shown in FIGS. 14A to 14C, in which the non-machinable portion 60, such as the compound surfaces 59, 61 or 62, is produced, it is necessary to use the diffracted light of the higher orders depending on the diffraction angle required and the width of the non-machinable portion 60 consequent upon the shape of the end 56a of the bit 56 used for machining the transcription surface 22a of the metal die 52.

On the other hand, if the diffraction surface is of such a shape as not to produce the non-machinable portion, as in the case of the compound surface 63 or 64, shown in FIGS.

14D and 14E, there is imposed no constraint on the shape of the end 56a of the bit 56 or on the number of orders of the diffracted light for the required diffraction angle. In particular, if the compound surface 64 has the stepped diffraction surface 64d with the right-angled blaze angle θ, as shown in FIG. 14d, the surfaces of the corresponding portions of the respective blazes run parallel to one another beginning from the mid portion to the outermost rim of the compound surface 64, thus advantageously assuring facilitated machining and shape evaluation.

The micro-irregular shape of the concentric circles formed on the compound surfaces $S_1$, $S_4$, as the surfaces of the compound lenses 35d, 35d1 of the objective lenses 35, 35A according to the present invention, with the micro-irregular shape being of a periodic structure having a period on the order of approximately one-half of the reference wavelength (405 nm) and an amplitude on the order of approximately one-half of the reference wavelength, is hereinafter explained.

As shown in FIG. 13, already explained, the metal die 52 is formed by rotating the blank 53 about the axis of rotation 54 of the lathe, in the direction indicated by arrow S, and by moving the bit 56 in the direction indicated by arrow T as the bit is moved in the up-and-down direction with respect to the blank 53, to cut the transcription surface 52a.

Figure 17:
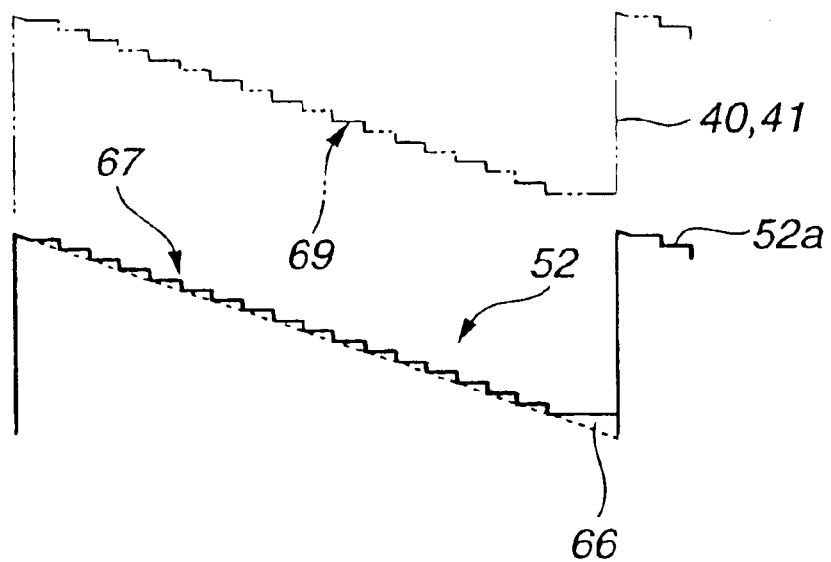
FIG. 17 is a schematic longitudinal cross-sectional view showing a saw-tooth-like structure in producing a blaze type diffraction surface by machining employing a diamond bit.

Referring to FIG. 17, showing the shape of blaze transcription of the compound surface $S_1$ or $S_4$ of the objective lens unit 35 or 35A, formed in the transcription surface 52a of the metal die 52, to an enlarged scale, if the transcription surface 52a is machined as the bit 56 is moved continuously along the ideal blaze shape (shape of transcription) 65A, shown with a dotted line, there is produced a blaze transcription shape comprised of a non-machinable portion 66, as the machining error with respect to the ideal blaze shape 65A, and a serrated structure 67

Figure 18A:
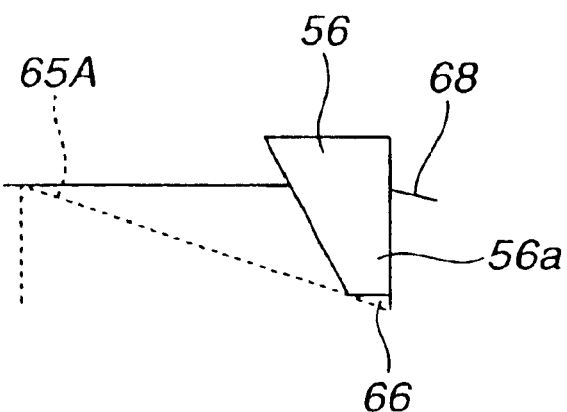
FIGS. 18A and 18B are schematic longitudinal cross-sectional views showing the process of forming a blaze type diffraction surface by machining employing a diamond bit.

FIG. 18A shows the state in which the bit 56 is machining the lowermost point of the blaze. That is, the bit 56 is moved along the ideal blaze shape 65 as the blank 53 is kept in a rotating state. There is left the non-machinable portion 66 at a lower portion of the bit 56, in the cross-sectional shape 68 formed during machining with the bit 56.

Figure 18B:
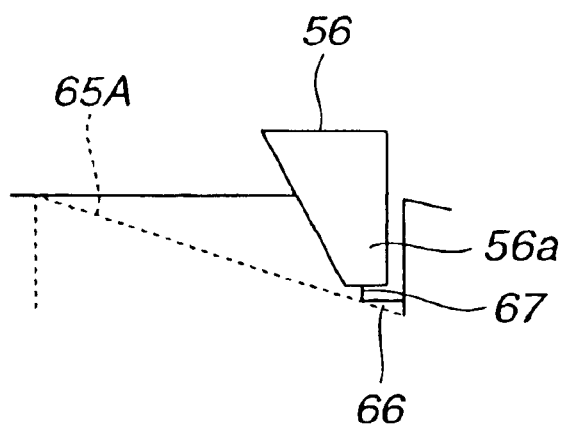

FIG. 18B shows the state in which the bit 56 is cutting the vicinity of the lowermost blaze point after one complete revolution of the blank 53 beginning from the state shown in FIG. 18A. Since the bit 56 is being moved along the ideal blaze shape 65A, and the blank 53 is rotating at a constant speed, the trace of cut by the bit 56 every complete revolution is microscopically not linear but the serrated structure 67 is produced. Since the serrated structure 67 is transcribed in this manner to the objective lens unit as a result of forming by the metal die, fine micro-irregular shape 69 is formed on the compound surface of the objective lens unit, as shown in FIG. 17, in which the blaze shape of the objective lens unit corresponding to the transcription shape of the metal die is shown enlarged with a chain-dotted line.

Figure 19:
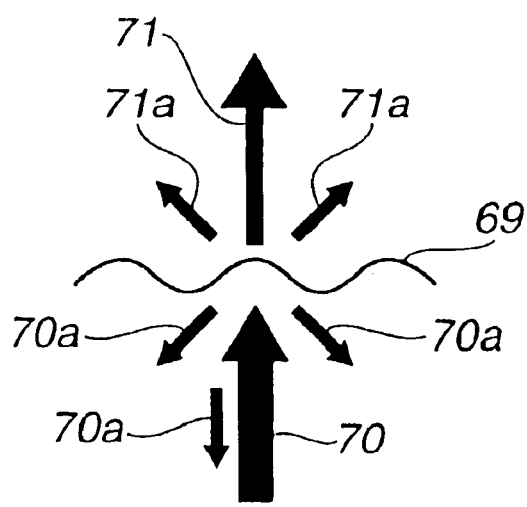
FIG. 19 schematically shows the state of the incident light and the outgoing light on the surface presenting a saw-tooth-like structure.

FIG. 19 shows, to an enlarged scale, the state of light transmission and light reflection of the compound surface of the objective lens unit on which the fine micro-irregular shape 69 has been formed as a result of transcription of the serrated structure 37. It may be seen that the laser light 70 is partially diffused on the compound surface to produce reflected light rays 70a, 70a, . . . to decrease the transmittance, while transmitted light 71 is refracted in an unforeseen direction, depending on the surface shape of the fine micro-irregular shape 69 to produce stray light beams 71a, 71a, . . . to degrade the transmittance of the surface presenting the fine micro-irregular shape 69 further. Since the blaze shape (optical diffractive unit) is formed on the compound surfaces $S_1$ and $S_4$ of the objective lens unit 35 or 35A, even though the fine micro-irregular shape 69 is formed as a result of transcription of the serrated structure 67 of the metal die 52, it is not possible to polish the compound surfaces $S_1$ and $S_4$.

Thus, in the objective lens unit 35 or 35A of the present invention, the movement of the bit 56 with respect to the blank 53 as the material of the metal die 52 is optimally controlled during machining of the metal die 52 to form the serrated structure 67 to a concentric shape of a periodic structure having a period approximately one-half the reference wavelength and an amplitude approximately one-half the reference wavelength, in order that the fine micro-irregular shape 69 formed on transcription of the serrated structure 67 on the compound surface $S_1$ or $S_4$ will be of the aforementioned period and amplitude. Preferably, the orientation of the fine micro-irregular shape 69 is coincident with the orientation of the blaze transcription shape, so that the shape of each blaze will be similar to that of the inclined side of the fine micro-irregular shape.

Figure 20:
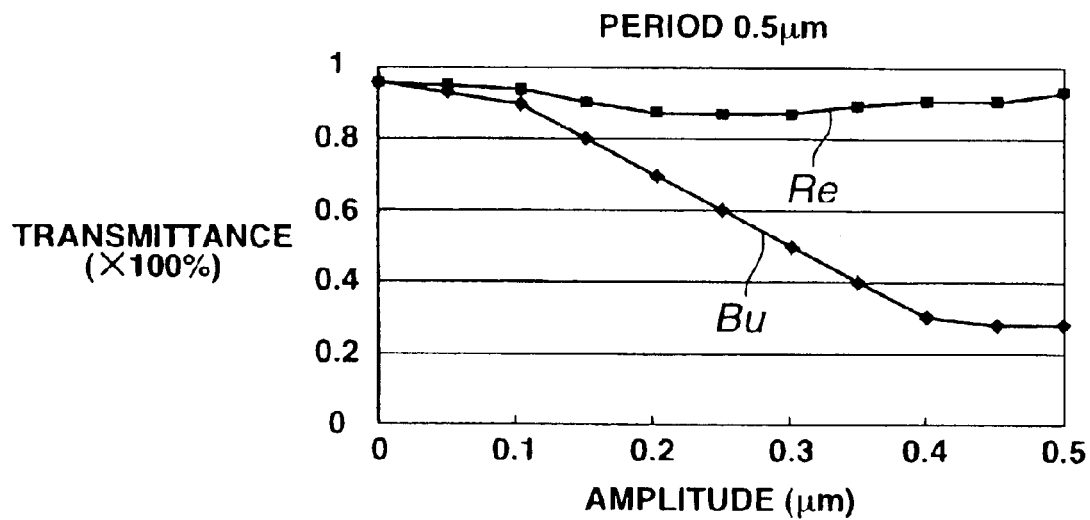
FIG. 20 is a graph showing the relation between the transmittance and the amplitude (height) of a structure having the surface presenting micro-irregularities of a preset period of the order of the wavelength.
Figure 21:
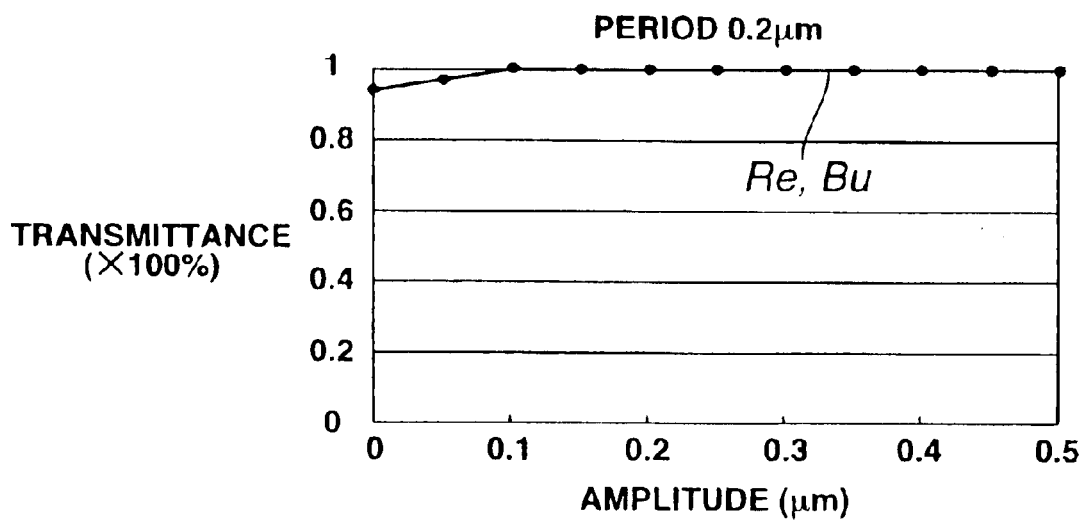
FIG. 21 is a graph showing the relation between the transmittance and the amplitude (height) of a structure having the surface presenting micro-irregularities of a preset period of the order of one-half the wavelength.

FIGS. 20 and 21 show the situation as to how the fine micro-irregular shape 69 is to be of the aforementioned period and amplitude.

FIG. 20 shows the relation between the amplitude (height) of the fine micro-irregular shape and the transmittance in case the period of the fine micro-irregular shape, as the shape of transcription of the serrated structure, is set to 0.5 μm, which is of the same order of magnitude as the working wavelength. For comparison, there are also shown the results of calculations for a case in which the blue laser Bu used in the present invention (wavelength of 405 μm) is incident and for a case in which the red laser Re used up to now (wavelength of 650 μm) is incident.

FIG. 21 shows the relation between the amplitude (height) of the fine micro-irregular shape and the transmittance in case the period of the fine micro-irregular shape, as the shape of transcription of the serrated structure is set to 0.2 μm which is approximately one-half the working wavelength. For comparison, there are also shown the results of calculations for a case in which the blue laser Bu used in the present invention (wavelength of 405 μm) is incident and for a case in which the red laser Re used up to now (wavelength of 650 μm) is incident.

If calculated in terms of the red laser light Re (wavelength of 650 μm) as a reference, the period of the fine micro-irregular shape of 0.5 μm is lesser than the wavelength. However, if calculated in terms of the blue laser light Bu (wavelength of 405 μm) as a reference, the period of the fine micro-irregular shape is of the order of the wavelength or larger.

On the other hand, the period of the fine micro-irregular shape of 0.2 μm is on the order of one-half the wavelength or less no matter whether it is calculated in terms of the red laser light Re (wavelength of 650 μm) as a reference or in terms of the blue laser light Bu (wavelength of 405 μm) as a reference.

That is, if the blue laser light Bu (wavelength of 405 μm) is caused to incident on the surface presenting the fine micro-irregular shape with a period of 0.5 μm, the transmittance is lowered with increasing amplitude (height). If the amplitude (height) is 0.5 μm which is of the same order of magnitude as the working wavelength, the transmittance is 30% or lower.

If the red laser light Re (wavelength of 650 μm) is caused to incident on a similar surface, the transmittance is on the order of 85%, without dependency on the height, in case the amplitude (height) is approximately in a range from 0 to the wavelength.

Figure 2:
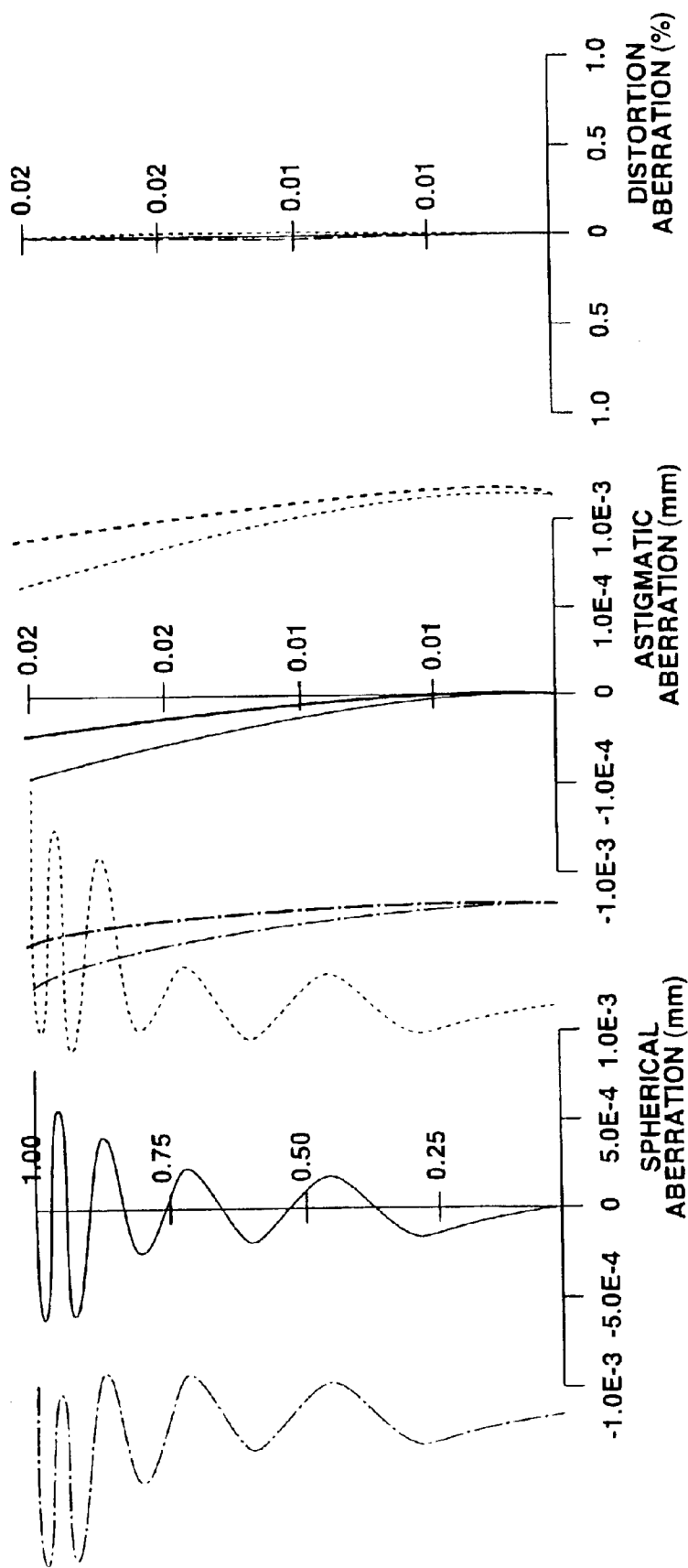
FIG. 2A is a graph showing characteristics of spherical aberration of an objective lens unit used in FIG. 1.
FIG. 2B is a graph showing characteristics of astigmatic aberration thereof and FIG. 2C is a graph showing characteristics of distortion aberration thereof.

When the blue laser light Bu (wavelength of 405 µm) is caused to incident on the surface presenting the fine micro-irregular shape with a period of 0.2 µm, shown in FIG. 2, or the red laser light Re (wavelength of 650 µm) is caused to incident on a similar surface, the transmittance is on the order of 95%, without dependency on the height, in case the amplitude (height) is approximately in a range from 0 to the wavelength.

Moreover, if the amplitude (height) is controlled to be in a range from approximately one-half the wavelength to a magnitude approximately equal to the wavelength, the surface exhibits anti-reflection effects.

For forming the shape of transcription of the compound surface, combined from the refractive surface and the diffraction surface, on the transcription surface 52a of the metal die 52, a method by etching or a process used in preparation of a semiconductor, such as thin film depositing method, may be used in addition to the method by machining with the lathe and the bit 56, as described above.

Meanwhile, the shape of the aspherical single lens 35r, which is the refraction type lens of the objective lens unit 35 or 35A, is meniscus due to use of a vitreous material having a high refractive index. Thus, if the refraction/diffraction compound surface is to be formed on the laser light incident surface, the shape of the compound surface corresponds to the transcribed compound surface 59, shown in FIG. 14A, because the base surface has a large radius of curvature and a positive refractive power. If the refraction/diffraction compound surface is to be formed on the laser light outgoing surface, as with the objective lens unit 35A, the shape of the compound surface corresponds to the transcribed compound surface 62, 63 or 64, shown in FIGS. 14C to 14F, because the base surface has a relatively moderate radius of curvature and a negative refractive power.

The designing of the stepped phase type diffraction grating, shown in FIGS. 14D to 14E, is hereinafter explained.

By the optical designing software "CODEV", the sag ASP(r) of the diffraction surface is defined as indicated by the following equation (19):

$$ASP(r) = \frac{cr^2}{1 + \sqrt{1 - (1+k)c^2r^2}} + Ar^4 + Br^6 + Cr^8 + Dr^{10}. \quad (19)$$

If, in this equation (19), k=−1, the quadratic coefficient is c/2, so that the above equation becomes a polynominal composed only of terms of even number orders, as indicated by the following equation (20):

$$ASP(r) = \frac{c}{2}r^2 + Ar^4 + Br^6 + Cr^8 + Dr^{10}. \quad (20)$$

On the other hand, the phase distribution $\phi(r)$ of the diffraction surface S2d of the compound surface $S_2$ is defined by a polynominal composed only of even number orders, as indicated by the following equation (21):

$$\phi(r) = C_1 r^2 + C_2 r^4 + C_3 r^6 + C_4 r^8 + C_5 r^{10} \quad (21).$$

Consequently, the phase is handled as a continuously changing function, up to the optical designing, as indicated by the equation (21).

In designing the surface shape of the diffractive surface, the periodicity of the phase is exploited and the remnant phase obtained on subtracting the integer number multiple of the period from the phase period is the new phase distribution. Thus, the shape of the diffractive surface becomes a discrete blaze shape. Since the phase of this discrete blaze shape is calculated as an actual thickness of the bulk material, the diffractive surface is of a discrete blaze shape, while its height is a thickness which gives a phase difference equal to an integer number multiple of the wavelength.

Figure 22:
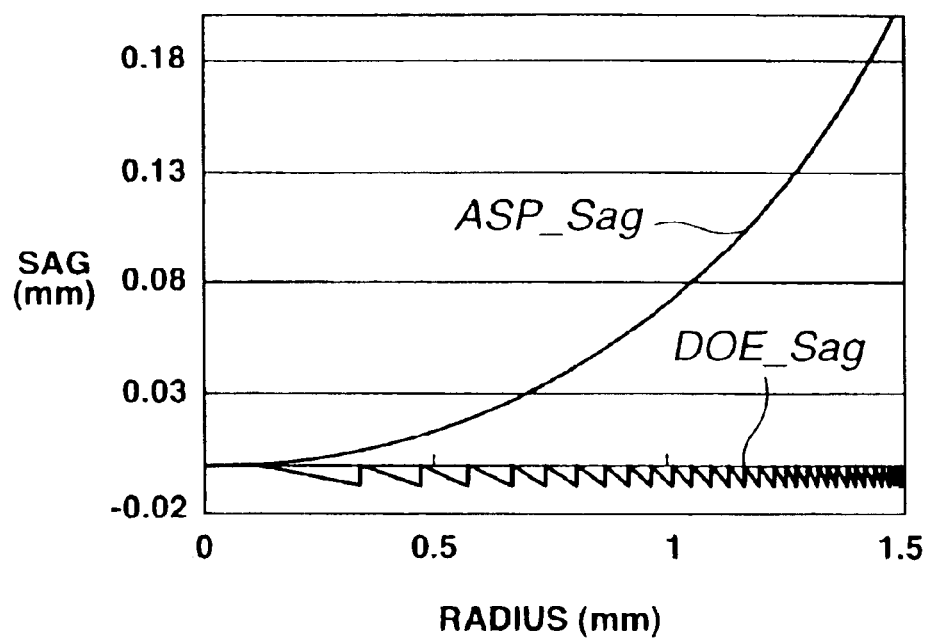
FIG. 22 shows the relation between the radial length and the sag on a diffraction surface and a refractive surface of a lens unit.

FIG. 22 illustrates the aspherical cross-sectional shape and the cross-sectional shape of the diffraction surface. The aspherical cross-sectional shape is derived from the equation (20), while the cross-sectional shape DOE_Sag of the diffraction surface is derived from the equation (21). In order to equate the dimension of the phase of the diffraction surface to the sag of the refractive surface, the phase is divided by the refractive index difference.

Figure 23:
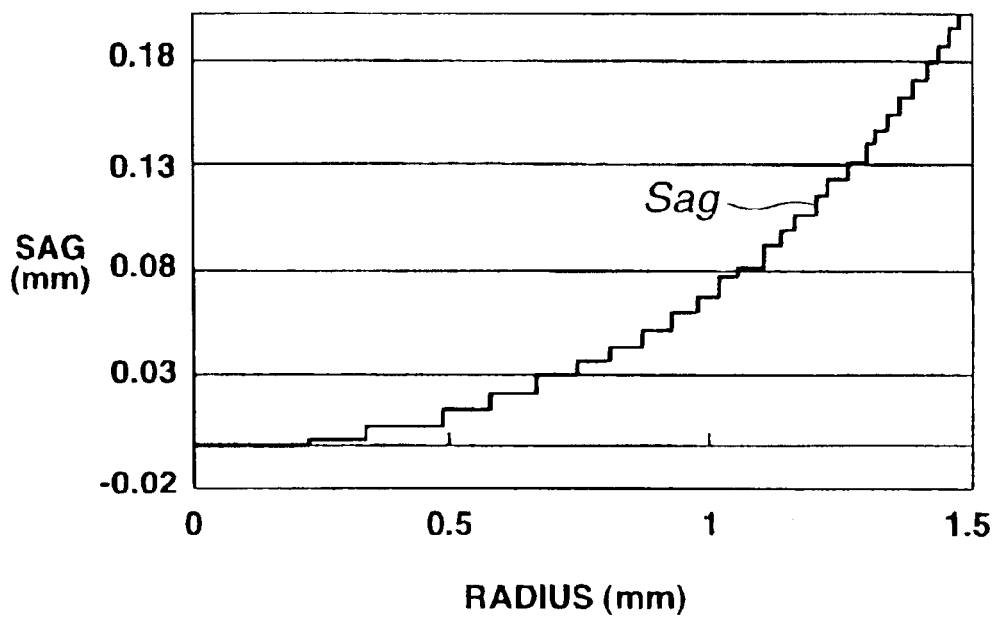
FIG. 23 shows the relation between the radial length and the sag on a compound surface combined from a diffractive surface and a refractive surface.

FIG. 23 illustrates the shape of the refraction/diffraction compound surface. The sag Sag(r) of the refraction/diffraction compound surface may be expressed by the following equation 22:

$$Sag(r) = ASP(r) + \frac{\Phi(r)}{N - 1}. \quad (22)$$

If, in the above equation (22), Sag(r)=0, the phase represents a complete surface, so that the incident light can be radiated unaffected. In this case, the shape of the diffraction surface is a step shape with a vertically upstanding riser, with the thickness affording the phase equal to an integer number multiple of the wavelength being one step. That is, for obtaining the solution for Sag(r)=0, it suffices to select the coefficients of the respective orders so that these coefficients cancel one another to zero, as indicated by the following equation (23):

$$k = -1 \quad (23)$$
$$C_1 = (N-1)\frac{C}{2}$$
$$C_2 = (N-1)A$$
$$C_3 = (N-1)B$$
$$C_4 = (N-1)C$$
$$C_5 = (N-1)D.$$

Meanwhile, the second order coefficient indicates that the refractive powers of the refraction surface and the diffraction surface cancel each other to zero in the near-axis region.

As described above, the objective lens unit 35 or 35A according to the present invention can be designed by optimizing the aspherical coefficients and the bending with the above-described conditions as the initial lens setting.

A numerical example of the objective lens unit 35 or 35A according to the present invention is now explained.

Figure 24:
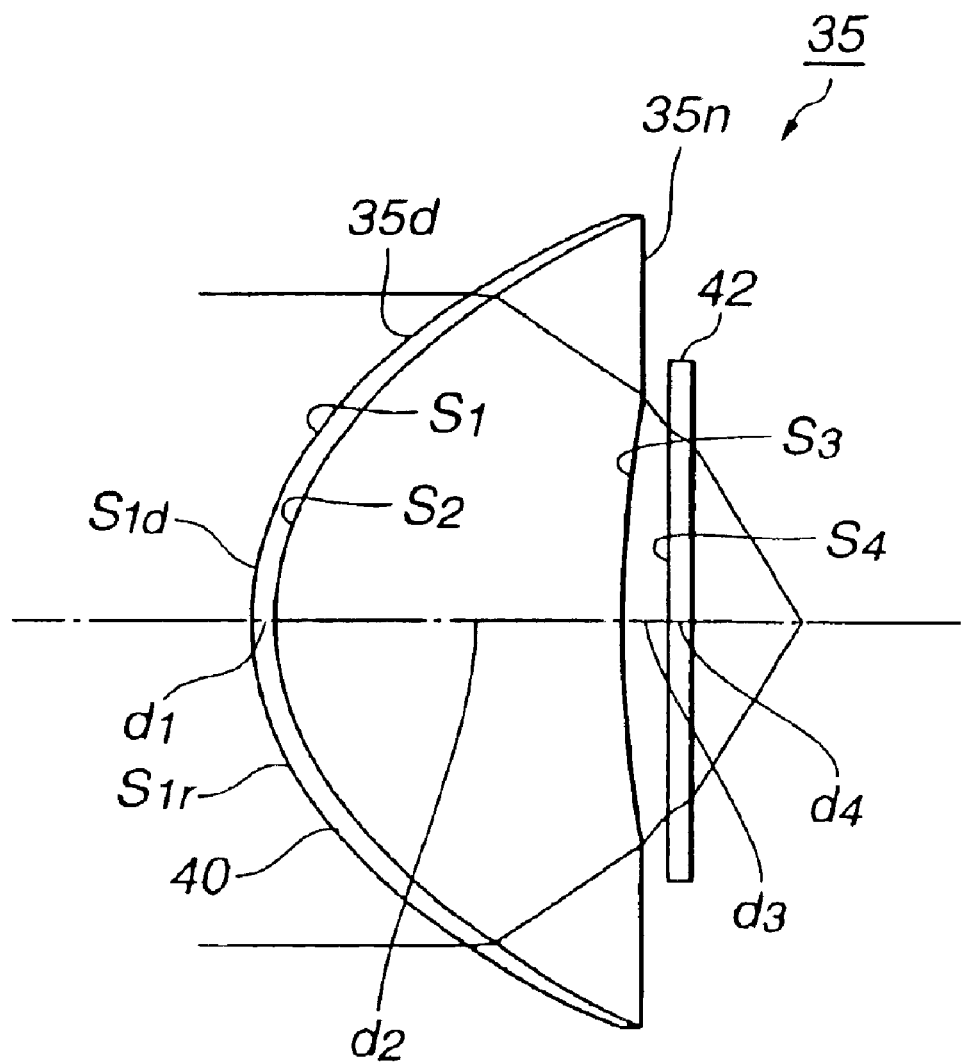
FIG. 24 shows a lens structure of a numerical example of an objective lens unit for an optical pickup according to the present invention.

FIG. 24 shows a lens structure of the numerical example of the objective lens unit 35.

In the present numerical example, the vitreous material for the refractive type lens 35r is LAH53. A protective cover 42 of polycarbonate is arranged between the objective lens unit 35 and the image surface (recording layer of the optical disc 100).

The thickness of the protective cover 42 is preferably 0.3 mm or less.

The present numerical example for the objective lens unit 35 and a numerical example for the objective lens unit 35A as later explained are designed for the thickness of the protective cover 42 set to 0.1 mm, for the reason that, if the thickness of the protective cover 42 is not less than 0.3 mm, spherical aberration which is so severe as to render correction difficult is produced, whereas, if the thickness of the protective cover 42 is less than 0.3 mm, it is possible to suppress generation of the spherical aberration.

The following table 3 shows respective values of the numerical example for the objective lens unit 35. It is noted that $r_i$ depicts the radius of curvature of the ith surface $S_i$ as counted from the light source side and $d_i$ depicts the surface-to-surface separation on the optical axis between the ith surface and the (i+1)st surface, as described above. This applies for the Table 5 as well.

TABLE 3

| $r_i$ | $d_i$ | material type |
|---|---|---|
| $r_1$ = 1.417 | $d_1$ = 0.01 | resin |
| $r_2$ = 1.417 | $d_2$ = 1.51 | LAH53 |
| $r_3$ = 4.093 | $d_3$ = 0.74 | |
| $r_4$ = ∞ | $d_4$ = 0.10 | polycarbonate |
| image surface = ∞ | | |

Table 4 shows conical constants k and the degree four to degree twenty aspherical coefficients of the first surface $S_1$ (diffraction surface $S_{1d}$ and the refractive surface $S_{1r}$), second surface $S_2$ and the third surface $S_3$, making up the compound surfaces of the numerical example for the objective lens unit 35. Meanwhile, in Table 2, as in the following relevant tables, E stands for the exponent with 10 as base. This applies for the following similar tables as well.

TABLE 4

| | $S_{1d}$ | $S_{1r}$ | $S_2$ | $S_3$ |
|---|---|---|---|---|
| K($C_1$) | −3.527E−03 | −6.324E−01 | −6.324E−01 | −16.836 |
| A($C_2$) | −1.894E−04 | +1.267E−02 | +1.267E−02 | −7.755E−03 |
| B($C_3$) | −2.090E−04 | −6.013E−04 | −6.013E−04 | −5.502E−03 |
| C($C_4$) | +3.005E−05 | +1.023E−03 | +1.023E−03 | +3.409E−03 |
| D($C_5$) | | −4.741E−04 | −4.741E−04 | +2.808E−03 |
| E($C_6$) | | | | −1.901E−03 |
| F($C_7$) | | | | −2.970E−04 |
| G($C_8$) | | | | +3.010E−06 |
| H($C_9$) | | | | +2.979E−04 |
| I($C_{10}$) | | | | −8.878E−05 |

Figures 25A, 25B, 25C:
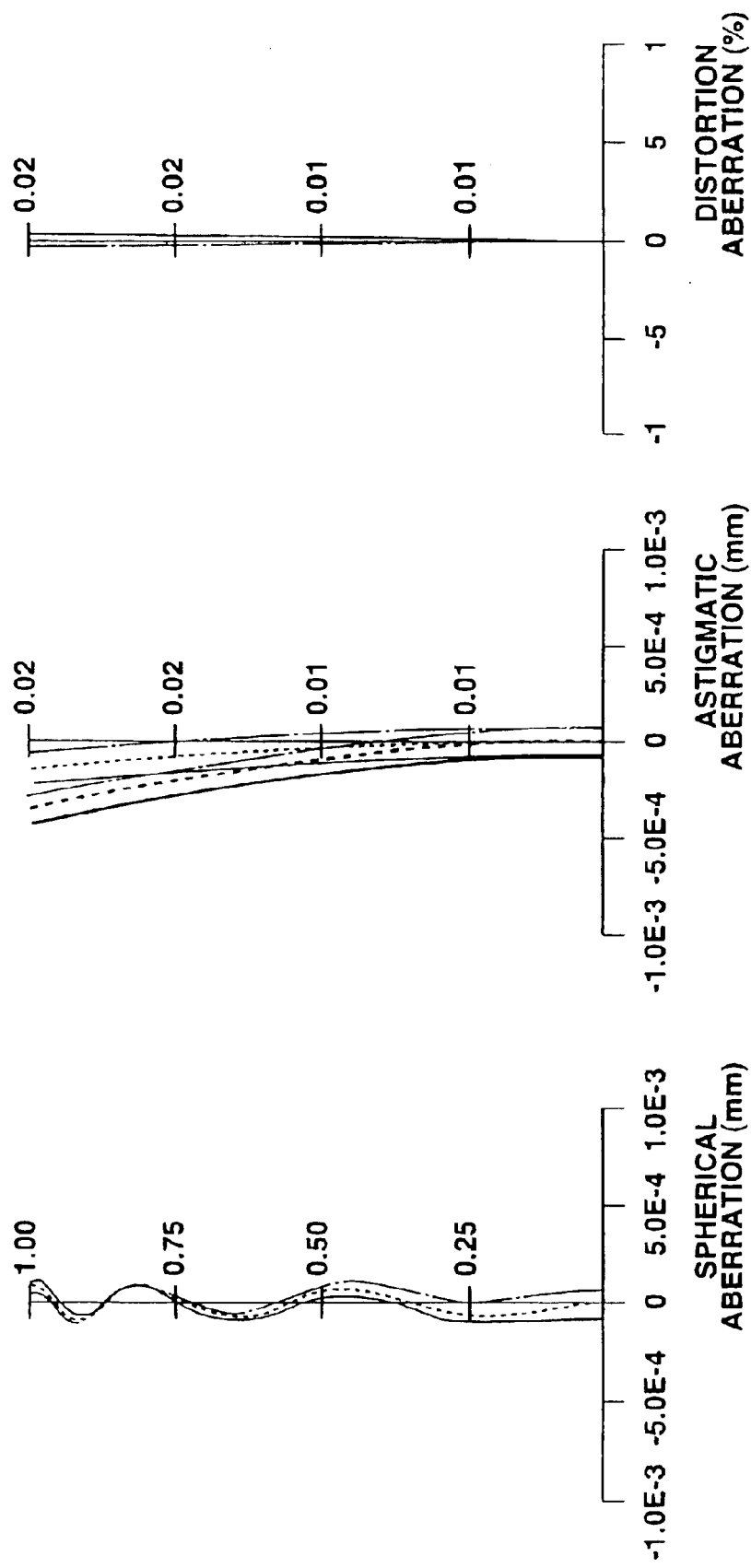
FIG. 25A is a graph showing spherical aberration of a modification of an objective lens unit according to the present invention.
FIG. 25B shows astigmatic aberration thereof and FIG. 25C shows distortion aberration thereof.

FIGS. 25A, 25B and 25C show spherical aberration, astigmatic aberration and the distortion aberration for the numerical example. In the aberration charts, solid lines, dotted lines and chain-dotted lines indicate values for 405 nm, 403 nm and 407 nm, respectively. In the chart for astigmatic aberration, thick and fine lines depict the values for the sagittal image surface and the tangential image surfaces, respectively. This applies for similar charts as later explained. In the above numerical example, the diffraction reference wavelength is 405 nm, the design degree of orders is 10, the design wavelength is 405 nm (403 to 407 nm) and the numerical aperture is 0.85. As shown in the aberration charts of FIGS. 25A to 25C, the chromatic aberration of the objective lens unit 35 has been corrected effectively in the above numerical example.

Figure 26:
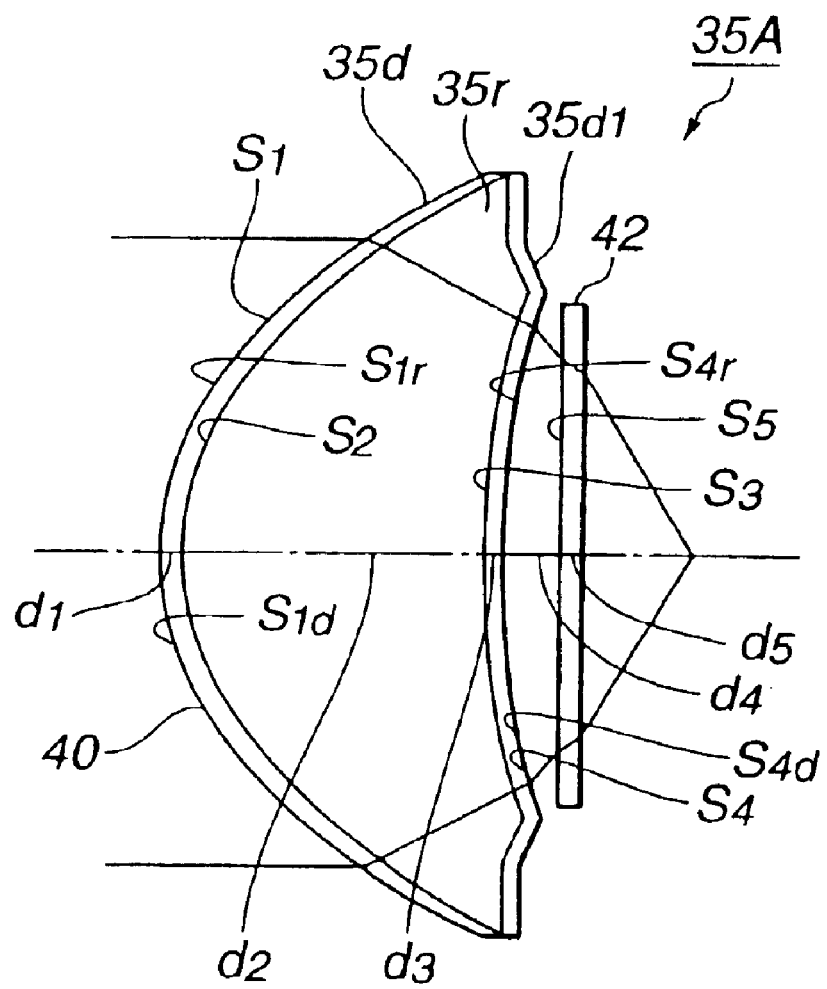
FIG. 26 shows a lens structure of another numerical example of an objective lens unit for an optical pickup according to the present invention.

FIG. 26 shows a lens structure of a modified numerical example of the objective lens unit 35A.

In this numerical example, the aforementioned LAH53 is used as the vitreous material for the refractive type lens 35r, as in the case of the objective lens unit 35. A protective cover 42 is provided between the second lens $L_2$ and the image surface (recording layer of the optical disc 100).

Table 5 shows numerical values of the numerical example for the objective lens unit 35A.

TABLE 5

| $r_i$ | $d_i$ | vitreous material |
|---|---|---|
| $r_1$ = 1.454 | $d_1$ = 0.10 | resin |
| $r_2$ = 1.454 | $d_2$ = 1.50 | LAH53 |
| $r_3$ = 4.121 | $d_3$ = 0.01 | resin |
| $r_4$ = 4.121 | $d_4$ = 0.78 | |
| $r_5$ = ∞ | $d_5$ = 0.10 | polycarbonate |
| image surface = ∞ | | |

Table 6 shows conical constants k and the degree four to degree twenty aspherical coefficients A to D of the first surface $S_1$, as the compound surface (diffraction surface $S_{1d}$ and the refractive surface $S_{1r}$), second surface $S_2$, the third surface $S_3$, and the fourth surface, as the compound surface (diffraction surface $S_{4d}$ and the refractive surface $S_{4r}$), of the numerical example for the objective lens unit 35A.

TABLE 6

| | K($C_1$) | A($C_2$) | B($C_3$) | C($C_4$) | D($C_5$) |
|---|---|---|---|---|---|
| $S_{1d}$ | −1.638E−03 | +3.320E−04 | −1.740E−04 | +4.250E−05 | |
| $S_{1r}$ | −6.807E−01 | +1.862E−02 | −7.617E−04 | +2.446E−03 | −7.848E−04 |
| $S_2$ | −6.807E−01 | +1.862E−02 | −7.617E−04 | +2.446E−03 | −7.848E−04 |
| $S_3$ | −1.000E+00 | +8.237E−02 | −1.658E−01 | +1.031E−01 | −2.372E−02 |
| $S_{4d}$ | −6.430E−02 | −4.366E−02 | +8.789E−02 | −5.465E−02 | +1.257E−02 |
| $S_{4r}$ | −1.000E+00 | +8.237E−02 | −1.658E−01 | +1.031E−01 | −2.372E−02 |

FIGS. 27A, 27B and 27C show the spherical aberration, astigmatic aberration and the distortion aberration of the objective lens unit 35A in the above numerical example, respectively. The diffraction reference wavelength is 405 nm, the design degree of orders of the first surface or the diffraction surface $S_{1d}$ is 10, the design degree of orders of the fourth surface or the diffraction surface $S_{4d}$ is one, the design wavelength is 405 nm (403 to 407 nm) and the numerical aperture is 0.85. As shown in the aberration charts of FIGS. 27A to 27C, the chromatic aberration of the objective lens unit 35 has been corrected effectively for the objective lens unit 35A of the above numerical example.

With the objective lens unit 35 according to the present invention, described above, the on-axis chromatic aberration can be reduced substantially to zero, even though the wavelength of the laser light from the laser light emitting unit 37 is varied, such that the working distance can be selected to a large value as the necessary numerical aperture is kept, while the curvature of the base surface may be suppressed to a lower value, thus assuring facilitated machining of the blaze shape.

With the objective lens unit 35A according to a modified embodiment of the present invention, described above, image height characteristics may be improved further, in addition to achieving the favorable effect possible with the aforementioned objective lens unit 35. In the objective lens unit 35A, in which the diffraction surface $S_{4d}$ of the compound surface $S_4$ has a stepped cross-sectional shape, so that the diffraction efficiency is advantageously not lowered on the outer rim of the compound surface $S_4$.

With the objective lens units 35 and 35A of the present invention, the chromatic aberration may be comprised within 0.01 μm/nm against wavelength variations of ±2 nm, so that, in the optical pickup or in the disc driving device, employing the objective lens units, information recording and/or reproduction may be achieved in stability. Moreover, since the spot size of the laser light can be wine-pressed close to the diffraction limit, the performance of the objective lens unit may be sufficient to cope with the standard of the optical disc in which the information recording density has been improved by reducing the track pitch.

With the objective lens units 35 and 35A of the present invention, in which the single lens of glass is used as the refractive type lens 35r, it is possible to reduce the number of component parts as well as the size and the weight of the lens unit, while the assembling of the lens unit to the optical pickup is facilitated.

With the objective lens units 35 and 35A of the present invention, in which the aperture composed of a thin film of e.g., metal is provided to the surface closest to the light source, it is possible to suppress manufacturing error at the time of assembling the lens unit to assure stabilized performance by allowing to use only the lens area providing satisfactory optical characteristics without allowing to use the lens rim portion.

By employing the objective lens units 35 and 35A of the present invention for an optical pickup having large laser power, that is including means for varying the laser power to reduce the laser noise, in order to cope with the rewritable optical disc which is expected to prove the main stream of the future optical disc, it is possible to improve the recording and/or reproducing performance of the high recording density information.

Moreover, with the objective lens units 35 and 35A of the present invention, in which the serrated structure 37 is formed to a concentric pattern of a periodic structure having the period approximately one-half the reference wavelength and the amplitude approximately one-half the reference wavelength, by controlling the movement of the bit 56 relative to the blank 23 as the material for the metal die 52 in machining the transcription surface 22a of the metal die 52, and in which the micro-irregular shape finer than the blaze shape is afforded to the compound surfaces $S_1$ and $S_4$, by transcription of the serrated structure 67 along with the shape of the compound surfaces $S_1$ and $S_4$, it is possible to provide for transmittance of not less than 90% of the compound surfaces $S_1$ and $S_4$, which cannot be polished, despite transcription of the serrated structure 67 of the metal die 52.

With use of the optical pickup, employing the objective lens unit according to the present invention, such a disc driving device may be provided which has been improved in recording and/or reproducing performance for the high recording density information signals.

The specified shape or structure of respective parts, shown in the above-described embodiments, represent specified examples for executing the present invention, and hence should not be construed as limiting the scape of the invention.

Industrial Applicability

With the objective lens unit, optical pickup and the disc driving device employing the objective lens unit, according to the present invention, the chromatic aberration can be effectively corrected for a wavelength range of several nm, with 420 nm as a reference, it is possible to wine-press the spot diameter of the laser light close to the limit of diffraction, thus allowing to cope with the standard of the optical recording medium in which the information recording density has been raised by reducing the track pitch.

What is claimed is:

1. An objective lens unit for an optical pickup comprising:
   a resin layer having, sequentially from an object side, a first surface as an aspherical surface and a second surface as an aspherical surface, at least one of the first surface and the second surface including a diffractive surface; and
   a lens of glass having said second surface as an aspherical surface and a third surface as an aspherical surface;
   wherein the objective lens unit is corrected for the chromatic aberration on an image surface on the optical axis with respect to the light of a reference wavelength not larger than 420 nm within several nm of said reference wavelength; the numerical aperture of the objective lens unit being not less than 0.8.

2. The objective lens unit for an optical pickup according to claim 1 wherein said first surface includes a diffractive surface.

3. The objective lens unit for an optical pickup according to claim 1 wherein said second surface includes a diffractive surface.

4. The objective lens unit for an optical pickup according to claim 1 wherein the working distance from said third surface to an image point is not less than 0.5 mm.

5. The objective lens unit for an optical pickup according to claim 4 wherein one of said first and second surfaces including the diffractive surfaces has an aspherical coefficient value.

6. The objective lens unit for an optical pickup according to claim 5 wherein said first and second surfaces are of the same base curvature and the same aspherical coefficient.

7. The objective lens unit for an optical pickup according to claim 6 wherein said resin layer is of a phase type, and said first surface or the second surface is of the blaze shape.

8. The objective lens unit for an optical pickup according to claim 1 wherein an aperture is formed in the outer rim of said first surface.

9. The objective lens unit for an optical pickup according to claim 1 wherein said diffractive surface has the design degree of orders of not less than two.

10. The objective lens unit for an optical pickup according to claim 1 wherein said resin layer has a thickness not larger than 0.1 mm.

11. The objective lens unit for an optical pickup according to claim 1 wherein said lens of glass has a refractive index of a vitreous material not less than 1.65 for the light with a wavelength not larger than 420 nm.

12. The objective lens unit for an optical pickup according to claim 1 wherein said lens of glass has a meniscus shape.

13. The objective lens unit for an optical pickup according to claim 1 wherein a fine micro-irregular shape of a periodic structure having a period approximately one-half the reference wavelength and an amplitude approximately one-half the reference wavelength is formed on said first surface or said second surface, including said diffractive surface, said fine micro-irregular shape being of a concentric pattern finer than a micro-irregular shape of said diffractive surface.

14. The objective lens unit for an optical pickup according to claim 1 wherein a protective cover having a thickness not larger than 0.3 mm is provided between said third surface and said image surface, and a spherical aberration ascribable to said protective cover is corrected.

15. The objective lens unit for an optical pickup according to claim 1 wherein said objective lens unit further includes a fourth surface having an aspherical surface, said resin layer having at least one of said third and fourth surfaces including another diffractive surface.

16. The objective lens unit for an optical pickup according to claim 15 wherein said third surface includes said another diffractive surface.

17. The objective lens unit for an optical pickup according to claim 15 wherein said fourth surface includes said another diffractive surface.

18. The objective lens unit for an optical pickup according to claim 15 wherein said resin layer is of a phase type, and said third surface or the fourth surface is of the blaze shape.

19. An optical pickup comprising:

a laser light emitting device for radiating the laser light, an objective lens unit for converging the laser light on a recording layer of an optical recording medium, a light receiving device for receiving the laser light and an optical component for causing the laser light radiated from said laser light emitting device to incident on said objective lens unit and for causing the laser light reflected by the recording layer of said optical recording medium and transmitted through said objective lens unit to incident on said light receiving device, wherein:

the objective lens unit includes a resin layer having, sequentially from an object side, a first surface as an aspherical surface and a second surface as an aspherical surface, at least one of the first surface and the second surface including a diffractive surface, and a lens of glass having said second surface as an aspherical surface and a third surface as an aspherical surface, wherein the objective lens unit is corrected for the chromatic aberration on an image surface on the optical axis with respect to the light of a reference wavelength not larger than 420 nm within several nm of said reference wavelength, with the numerical aperture of the objective lens unit being not less than 0.8.

20. The optical pickup according to claim 19 wherein the working distance from said third surface to an image point is not less than 0.5 mm.

21. The optical pickup according to claim 19 wherein a protective cover having a thickness not larger than 0.3 mm is provided between said third surface and said image surface, and a spherical aberration ascribable to said protective cover is corrected.

22. The objective pickup according to claim 19 wherein laser light emitting device emits laser light having a wavelength not larger than 420 nm.

23. The objective pickup according to claim 19 wherein said objective lens unit further includes a fourth surface having an aspherical surface, said resin layer having at least one of said third and fourth surfaces including another diffractive surface.

24. A disc driving device for recording and/or reproducing information on a rotating disc-shaped optical recording medium by an optical pickup movable along the radius of said optical recording medium, wherein said optical pickup includes:

a laser light emitting device for radiating the laser light with a wavelength of not larger than 420 nm, an objective lens unit for converging the laser light on a recording layer of an optical recording medium, a light receiving device for receiving the laser light and an optical component for causing the laser light radiated from said laser light emitting device to incident on said objective lens unit and for causing the laser light reflected by the recording layer of said optical recording medium and transmitted through said objective lens unit to incident on said light receiving device, wherein the objective lens unit includes:

a resin layer having, sequentially from an object side, a first surface as an aspherical surface and a second surface as an aspherical surface, at least one of the first surface and the second surface including a diffractive surface, and a lens of glass having said second surface as an aspherical surface and a third surface as an aspherical surface, wherein the objective lens unit is corrected for the chromatic aberration on an image surface on the optical axis with respect to the light of a reference wavelength not larger than 420 nm within several nm of said reference wavelength, with the numerical aperture of the objective lens unit being not less than 0.8.

25. The disc driving device according to claim 24 wherein the working distance from said third surface to an image point is not less than 0.5 mm.

26. The disc driving device according to claim 24 wherein a protective cover having a thickness not larger than 0.3 mm is provided between said third surface and said image surface, and a spherical aberration ascribable to said protective cover is corrected.

27. The disc driving device according to claim 24 wherein said objective lens unit further includes a fourth surface including an aspherical surface, said resin layer having at least one of said third and fourth surfaces including another diffractive surface.

* * * * *